US006985871B2

(12) United States Patent
Simon et al.

(10) Patent No.: US 6,985,871 B2
(45) Date of Patent: Jan. 10, 2006

(54) SYSTEMS AND METHODS FOR SCHEDULING REOCCURRING DELIVERIES AND PICKUPS

(75) Inventors: Stephen Patrick Simon, Sparks, MD (US); Vincent Cucchiara, York, PA (US); Jay Delaney, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 10/076,029

(22) Filed: Feb. 12, 2002

(65) Prior Publication Data

US 2003/0033181 A1 Feb. 13, 2003

Related U.S. Application Data

(60) Provisional application No. 60/311,701, filed on Aug. 10, 2001.

(51) Int. Cl.
G06F 17/60 (2006.01)
(52) U.S. Cl. .......................................... 705/8
(58) Field of Classification Search ............. 705/7, 705/8
See application file for complete search history.

(56) References Cited

U.S. PATENT DOCUMENTS

| | | | |
|---|---|---|---|
| 5,265,006 A | 11/1993 | Asthana et al. | |
| 5,528,489 A | 6/1996 | Asahara et al. | |
| 5,541,848 A | 7/1996 | McCormack et al. | |
| 5,615,121 A | 3/1997 | Babayev et al. | |
| 5,616,899 A | 4/1997 | Recigno | |
| 5,692,125 A | 11/1997 | Schloss et al. | |
| 5,774,867 A | 6/1998 | Fitzpatrick et al. | |
| 5,809,479 A | 9/1998 | Martin et al. | |
| 5,848,395 A | 12/1998 | Edgar et al. | |
| 5,893,073 A | 4/1999 | Kasso et al. | |
| 5,920,846 A | 7/1999 | Storch et al. | |
| 5,922,040 A | 7/1999 | Prabhakaran | |
| 5,960,408 A | 9/1999 | Martin et al. | |
| 5,970,466 A | 10/1999 | Detjen et al. | |
| 6,010,239 A | 1/2000 | Hardgrave et al. | |

(Continued)

FOREIGN PATENT DOCUMENTS

GB 2368426 A * 5/2002

OTHER PUBLICATIONS

"E-Business in the New Beverage Marketplace." Beverage Marketing Corporation of New Yprk, Sep. 2000.*
"Consumers Continue to Select PETsMART.com as Their Favorite Internet Pet Site." PR Newswire, p. 6751, May 24, 2000.*

(Continued)

Primary Examiner—Susanna M. Diaz
(74) Attorney, Agent, or Firm—Alston & Bird LLP

(57) ABSTRACT

An improved scheduling system for scheduling, in real time, two or more customer visits (e.g. pickups, deliveries, or service visits) in response to a single request. The single request preferably specifies a date and a time window for a first customer visit, and a periodic schedule according to which the customer visit should reoccur. Accordingly, the system allows a user to use a single request to schedule a series of periodically-reoccurring customer visits. In one embodiment, responsive to the request, the system firmly schedules the first customer visit, and tentatively schedules all other customer visits in the series. Shortly before each tentatively scheduled customer visit is to occur, the system determines whether to make the tentatively scheduled customer visit in view of holidays, capacity, and cost. If so, the system firmly schedules the customer visit. If not, the system notifies the user and allows the user to reschedule the visit.

23 Claims, 31 Drawing Sheets

U.S. PATENT DOCUMENTS

| | | | |
|---|---|---|---|
| 6,012,037 | A | 1/2000 | Yoshikawa |
| 6,029,140 | A | 2/2000 | Martin et al. |
| 6,035,278 | A | 3/2000 | Mansour |
| 6,047,260 | A | 4/2000 | Levinson |
| 6,064,976 | A | 5/2000 | Tolopka |
| 6,073,110 | A | 6/2000 | Rhodes et al. |
| 6,085,170 | A | 7/2000 | Tsukuda |
| 6,088,648 | A | 7/2000 | Shah et al. |
| 6,101,480 | A | 8/2000 | Conmy et al. |
| 6,167,379 | A | 12/2000 | Dean et al. |
| 6,192,346 | B1 | 2/2001 | Green |
| 6,240,362 | B1 | 5/2001 | Gaspard, II |
| 6,493,427 | B1 * | 12/2002 | Kobylevsky et al. ...... 379/67.1 |
| 6,701,299 | B2 * | 3/2004 | Kraisser et al. ................ 705/8 |
| 2001/0047285 | A1 * | 11/2001 | Borders et al. ................ 705/8 |
| 2002/0007299 | A1 * | 1/2002 | Florence ........................ 705/9 |

OTHER PUBLICATIONS

"E-Grocer Update." The Food Institute Report, p. 1, Feb. 26, 2001.*

PETsMART.com Web Site archived from May 11, 2000 through Aug. 16, 2000 on <URL:http://web.archive.org/web/*/http://www.petsmart.com>, retrieved on Mar. 30, 2004.*

U.S. Appl. No. 09/811,375, filed Mar. 16, 2001, Kraisser et al.

Timothy P. Henderson; "*Scheduling Software Helps Webvan Meet 30-Minute Delivery Window*", Jul. 2000, pp. 1-2; printed from www.stores.com.

The Descartes Systems Group, Inc.; "*Descartes, The Global Leader in E-Fulfillment*", Apr. 2000, pp. 1-2; printed from www.descartes.com.

The Descartes Systems Group, Inc.; "*DeliveryNets, E-Business Solutions to Customer Fulfillment*", pp. 1-2; printed from www.descartes.com around Jan. 2001.

The Descartes Systems Group, Inc.; "*e-Frame, A Framework for Building DeliveryNets*", p. 1-3; printed from www.decartes.com around Jan. 2001.

The Descartes Systems Group, Inc.; "*e-Scheduler, Web-Based self-Scheduling for Delivery*", pp. 1-3; printed from www.descartes.com around Jan. 2001.

Author Unknown; "*In the Driver's Seat, Mobile Technology Improves Route Delivery Efficiency and Saves Big Bucks for Multi-Marques*", Baking & Snack Magazine, Apr. 1998, pp. 1-2.

A. Breiner; "*Mobile Accounting System Keeps Deliveries Fresh*", Food Logistics, Apr. 15, 1999, p. 1.

The Descartes Systems Group, Inc.; "*E-Fulfillment Solutions*", Mar. 20, 2000; pp 1-2 and pp. 1-4, printed from www.decartes.com/solutions/dnet home3.html and www.descartes.com/solutions/catalog.html.

Author Unknown; "*Descartes Releases Customer-Centric Web Scheduling Solution for Home Delivery and Consumer Direct Operations*", Business Wire, Jan. 18, 2000, pp. 1-2, printed from http://quicken.excite.com/investments/news/story/bw/ . . . /a0322.htm&symbol=DSG.

P. Carter; "*Computer Based Truck Dispatch Works Wonders in Hunter Valley*", Austrailian Mining, Oct. 1990, pp. 42-46, vol. 82 (Australia).

P. Davis; "*Airline Ties Profitability Yield to Management*", SIAM News, May/Jun. 1994, pp. 1-6, vol. 27, No. 5; printed from http://www.siam.org/siamnews/mtc/mtc694.htm.

T. Baron; "*One Vendor, One Solution—Businesses Turn to ERP to Help Simplify Their Supply Chains and Avoid Integration Hassels*", Information Week, Nov. 8, 1999, p. 108.

Y. Hamaguchi, et al.; "*Transportation Scheduling System Based on Evolution Algorithm and Super Parallel Computer*", 'Steps Forward': Second World Congress on Intelligent Transport Systems; Nov. 1995, pp. 2037-2030, vol. 4 (Yokohoma, Japan).

UPS Parcel Service Company, "User's Guide to ROADNET 5000, Routing and Scheduling System," Version 5.6, 1996, Roadnet Technolgies, Inc., Timonium, Maryland.

UPS Logistics Group Company, "ROADNET 5000 Operations Guide," Version 6.02, 1997, Roadnet Technologies, Inc., Baltimore, Maryland.

"UPS Products," http://www.roadnet.com/products/default.html, one page, Oct. 15, 2003.

"Real-Time Delivery Management Provided," Refrigerated Transporter, May 1, 2001, p. 1, http://refrigeratedtrans.com/magazinearticle.
asp?magazinearticle=103659&magazineeid.

"Self-Select" Deliveries in Bar Code's UPS Package, e. logistics magazine, Jun./Jul. 2001, pp. 1-3, http://www.elogmag.com/magazine/12/ups.shtml.

UPS 2001 Press Releases, "UPS e-logistics Gives Power Boost to Back-End Fulfillment Solution," May 22, 2001, pp. 1-2, http://www.pressroom.ups.com/pressreleases/archives/archive/0,1363,3866,00.html.

UPS 2000 Press Releases, "On-Line Grocers Choose UPS's Roadnet Technologies For Complete Delivery Solution," Jan. 4, 2000, pp. 1-2, http://www.pressroom.ups.com/pressreleases/archives/archive/0,1363,3549,00.html.

International Search Report from corresponding PCT Application No. PCT/US02/25409 dated Aug. 8, 2002.

Airborne.com Launches Small Business Center. PR Newswire. Jun. 14, 2001, p. 1, see page 1 of printout.

Kirkbride, Rob. Steady at the Wheel Parker President Grew Up in the Trucking Business. The Grand Rapids Press. Jan. 8, 2001, p. A4, see p. 2 of printout.

Rosencrance, Linda. Lycos, Yahoo Launch Web Voice Services. Computerworld. Oct. 23, 2000, vol. 34, No. 43, p. 60, see p. 2 of printout.

My Yellow Web Site Puts Customer in Driver's Seat. PR Newswire. Jun. 16, 2000, p. 1, see p. 1 of printout.

* cited by examiner

SYSTEMS AND METHODS FOR SCHEDULING REOCCURRING DELIVERIES AND PICKUPS

CROSS REFERENCE TO RELATED APPLICATION

This application claims the benefit of U.S. Provisional Application Ser. No. 60/311,701, filed Aug. 10, 2001, and entitled "Re-Occurring Pickup and Delivery System."

FIELD OF THE INVENTION

This patent relates generally to delivery scheduling systems, and more particularly to systems for scheduling reoccurring deliveries and pickups.

BACKGROUND OF THE INVENTION

In the past, when a business wanted to schedule a shipment of goods from one of its suppliers, the business would have to contact the supplier over the phone or by mail to request that a shipment be made within certain preferred blocks of time on certain specified days. For example, the business might request that a shipment be made on Monday, July 19, between 1:00 pm and 5:00 pm, or on Tuesday, July 20, between 9:00 am and 12:00 pm. The supplier would then enter this order into a mainframe-based routing-and-scheduling program for processing. Later, the various orders would be processed along with other orders in a batch to determine when the various orders would actually be delivered. The business would then be informed as to whether the delivery would be made at one of the specified preferred times, or at some other time. Thus, there was a delay between the time that the business placed the order and the time that a delivery time for the order was confirmed.

Computer systems have now been developed that allow customers to schedule deliveries in real-time over the Internet. These systems generally allow users to schedule deliveries, one at a time, by selecting a time window in which the delivery is to be made from one or more available time windows.

One example of such a system is Webvan's Internet-based scheduling system for home grocery delivery. When using this system, a customer logs on to Webvan's website and then selects a date on which the customer wishes to have groceries delivered to their home. The system then identifies any time windows that are available for the customer's requested date and immediately displays a list of available and unavailable time windows on the customer's display screen. After the customer selects an available time window, the system instantly schedules a delivery to be made within the selected time window. If desired, the customer may schedule additional deliveries by repeating this process.

More specifically, when using the Webvan system, a user might request, for example, that a particular delivery be made on Sep. 28, 2001. In response, the system may indicate, for example, that it only has the capacity to make the requested delivery within the following time windows on September 28: (1) 9:00 am–10:00 am; (2) 11:00 am–12:00 pm; and (3) 2:00 pm–3:00 pm. In one example, the user might request that the delivery be made within the 9:00 am–10:00 am time window. In response, the system will instantly confirm that the particular delivery will be made on September 28 between 9:00 am and 10:00 am.

One disadvantage of current on-line, real-time delivery scheduling systems is that such systems require a customer to schedule each delivery individually. As a result, while these systems work well for customers (such as on-line bookstore customers) who place orders that vary in content and delivery time, these systems are not particularly convenient for users who wish to have the same delivery made on a periodic basis. For example, if a customer wishes to have the same set of items delivered to their home every other Thursday, the customer must re-schedule the delivery once every two weeks. This is undesirable because it requires the customer to spend an often significant amount of time regularly re-scheduling the order. In addition, real-time prior art systems do not allow the customer to reserve a series of delivery times in advance. Thus, because the customer has to reserve each delivery time within a series of deliveries individually, the customer must compete with other customers for each individual delivery time within the series. As a result, no customer can be sure that they will be able to schedule each delivery within a series of deliveries according to a set, periodic schedule.

In addition to allowing users to schedule deliveries, at least one prior art delivery scheduling program allows users to request that items be picked up from a business on a specified day. For example, U.S. Pat. No. 5,616,899 to Recigno teaches a scheduling system that allows a user to specify dates on which orders for dental appliances are to be picked up from various dental offices. However, like the early delivery scheduling systems discussed above, the Recigno system is not capable of functioning in a real time environment. Rather, to schedule a pickup, users must call a central dispatching center and request that a particular pickup be made at a preferred time on a preferred day. The user's request is then presumably entered into an offline system and the requested pickup is scheduled at a later time, presumably by hand or by using a standard off-line scheduling system. Although customers' delivery preferences are considered during scheduling, these preferences are presumably often overridden by other considerations, such as a deliverer's ability to make a pickup at a requested time.

Recigno teaches allowing a user to enter a standing request that a repeating series of pickups be made regularly on certain specified days. Thus, for example, a user may request that items be picked up from the user's offices on a weekly basis. When a user wishes to request that a pickup be made according to such a repeating schedule, the user manually enters the request into a "Pickup/Delivery Preferences" Box on a "Schedule Pickup/Delivery" input screen 194 such as the screen shown in FIG. 17A of Recigno. While this functionality is not described in detail in the application, it is presumed that such requests are processed offline by hand or by a standard offline routing and scheduling system. Accordingly, it is understood that users' requests that a pickup be made on a recurring basis are often accepted, but not satisfied, by the Recigno system.

Accordingly, one significant disadvantage of the Recigno system is that it provides no immediate feedback to users as to whether the system will be able to make any particular pickup within a requested series of pickups. Thus, for example, the system may allow a user to request that a pickup be made every Wednesday, even if no delivery trucks will be available to make a pickup for the next seven Wednesdays. In such a situation, even if the user properly requested that the pickup be made every Wednesday, the system would actually schedule the first seven pickups within the series of requested pickups to be made on days other than Wednesday. While such a system may be acceptable for scheduling pickups from commercial establishments that generally have employees available to assist with pickups during regular business hours (and that can, therefore, tolerate unpredictable variances in pickup schedules), such a system would not be useful for scheduling time-sensitive pickups from less tolerant customers, such as residential customers.

Thus, in light of the above, there is a need in the art for an improved delivery scheduling system that allows a user to schedule, in real time, two or more delivery vehicle visits (such as pickups or deliveries) in response to a single request. Preferably, such a system would allow the user to at least tentatively confirm the scheduled delivery vehicle visits upon scheduling the delivery vehicle visits, and would inform the user in advance if a particular delivery vehicle visit must be rescheduled.

SUMMARY OF THE INVENTION

The present invention provides an improved scheduling system that allows a user to schedule, in real time, two or more delivery vehicle visits (or, more broadly speaking, customer visits) in response to a single request. As described in detail below, this system allows the user to at least tentatively confirm the scheduled delivery vehicle visits upon scheduling the delivery vehicle visits, and informs the user in advance if a particular delivery vehicle visit must be rescheduled. A first preferred embodiment of the present invention accomplishes this by providing a system and method for: (1) receiving a single request from a user that a first delivery vehicle visit (e.g., a delivery or pickup of items) be made to the customer within a particular time window on a first day, and that a second delivery vehicle visit be made to the customer within the particular time window on a second day; (2) determining whether to schedule the first delivery vehicle visit within the particular time window on the first day; (3) determining whether to schedule the second delivery vehicle visit within the particular time window on the second day; (4) in response to a combination of receiving the request and determining that the first delivery vehicle visit should be scheduled within the particular time window on the first day, scheduling the first delivery vehicle visit to be made within the particular time window on the first day; and (5) in response to a combination of receiving the request and determining that the second delivery vehicle visit should be scheduled within the particular time window on the second day, scheduling the second delivery vehicle visit to be made within the particular time window on the second day. Preferably, Steps (1)–(6) above are performed in real time, and the system displays a confirmation message immediately after scheduling the first and second deliveries.

In a preferred embodiment of the invention, the system determines whether to schedule a particular delivery vehicle visit within a particular time window based upon whether it would be both possible and economically desirable to make the delivery vehicle visit within the particular time window. In a further preferred embodiment of the invention, the first and second delivery vehicle visits are both deliveries, and the second delivery includes substantially all of the items delivered in the first delivery. In this embodiment of the invention, the single request referenced above comprises: (1) a definition of the first set of items; (2) an indication that the first set of items should be delivered within the particular time window on the first day; and (3) an indication that the first set of items should be delivered, according to a reoccurring delivery schedule, within the particular time window on at least one day other than the first day.

A second preferred embodiment of the invention comprises a system and method for: (1) identifying a time window in which it would be possible for a delivery service to make a delivery vehicle visit to a customer on a particular day; (2) allowing a user to request that the delivery service make a first delivery vehicle visit to the customer within the time window; (3) allowing the user to specify that the user wishes to schedule a periodic series of delivery vehicle visits that includes the first delivery vehicle visit and one or more additional delivery vehicle visits, each delivery vehicle visit within the series to be made on a different day, but within the particular time window; (4) allowing the user to specify a schedule for the series of delivery vehicle visits; (5) scheduling the first delivery vehicle visit; (6) using a first set of scheduling information to determine whether to tentatively schedule each of the additional requested delivery vehicle visits; and (7) in response to determining, based on the first set of scheduling information, to tentatively schedule each of the additional requested delivery vehicle visits, tentatively scheduling each of the additional requested delivery vehicle visits. In a preferred embodiment of the invention, the above steps are executed in real time.

In a further preferred embodiment of the invention, the system is configured for allowing the user to define the periodic series of delivery vehicle visits by defining, within a single display window, a periodic relationship between each of the additional requested delivery vehicle visits and the first delivery vehicle visit. The system is also preferably configured for automatically specifying that substantially all of the items delivered in a first delivery should also be delivered during at least one additional requested delivery.

In an additional preferred embodiment of the invention, the system is configured for performing the steps of: (1) using a second set of scheduling information to determine whether to firmly schedule a particular one of the additional requested delivery vehicle visits; and (2) in response to determining, based on the second set of scheduling information, to firmly schedule the particular one of the additional delivery vehicle visits, firmly scheduling the particular one of the additional requested delivery vehicle visits. The system preferably performs the above steps as part of a periodic scheduling job that the system executes close to the date of the particular delivery vehicle visit. While executing this periodic scheduling job, the system preferably performs the steps of: (1) determining whether any of the additional requested delivery vehicle visits is tentatively scheduled to be made within a particular date range; (2) in response to determining that at least one of the additional requested delivery vehicle visits is tentatively scheduled to be made within the particular date range, using the second set of scheduling information to determine whether to firmly schedule the at least one of the additional requested delivery vehicle visits; and (3) in response to determining, based on the second set of scheduling information, to firmly schedule the at least one of the additional requested delivery vehicle visits, firmly scheduling the at least one of the additional requested deliveries.

In a preferred embodiment of the invention, the first and second sets of scheduling information referenced above preferably include information regarding previously scheduled series of delivery vehicle visits, previously scheduled one-time delivery vehicle visits, and the days on which the delivery service will not make delivery vehicle visits.

In a further preferred embodiment of the invention, if the system determines, based on the second set of scheduling information, not to firmly schedule a particular vehicle visit, the system automatically informs a user (for example, by e-mail, voice mail, or instant messaging) that the delivery vehicle visit must be rescheduled. In this embodiment of the invention, the system allows the user to electronically reschedule a delivery vehicle visit (for example, by e-mail or via a website) if the delivery service is unable to make the visit.

Another preferred embodiment of the invention comprises a system and method for scheduling delivery vehicle visits to a customer. The system is configured for performing the steps of: (1) receiving a request from a user that a first delivery vehicle visit be made to the customer on a first day within a first time window, and that a second delivery vehicle visit be made to the customer on a second day within a second time window; (2) determining whether to schedule the first delivery vehicle visit to be made on the first day within the first time window; (3) determining whether to schedule the second delivery vehicle visit to be made on the second day within the second time window; (4) in response to a combination of: (a) the request, and (b) a determination in Step (2) that the first delivery vehicle visit should be scheduled within the first time window on the first day, scheduling the first delivery vehicle visit to be made within the first time window on the first day; and (5) in response to a combination of: (a) the request, and (b) a determination in Step (3) that the second delivery vehicle visit should be scheduled within the second time window on the second day, scheduling the second delivery vehicle visit to be made within the second time window on the second day. In this embodiment of the invention, the step of determining whether to schedule the second delivery vehicle visit within the second time window on the second day includes determining whether a lag time between the first time window and the second time window is greater than a predetermined threshold lag time. In a preferred embodiment of the invention, the steps above are executed in a real time computing environment.

A further preferred embodiment of the invention comprises a system and method for scheduling delivery vehicle visits by a delivery service to a customer. This system is configured for performing the steps of: (1) identifying a first time window in which it would be possible for the delivery service to make, on a first day, a first delivery vehicle visit to the customer; (2) allowing a user to request that the delivery service make the first delivery vehicle visit to the customer on the first day within the first time window; (3) allowing the user to specify a second day on which a second delivery vehicle visit is to be made, the second delivery vehicle visit being related to the first delivery vehicle visit; (4) identifying a second time window in which it would be possible for the delivery service to make a delivery vehicle visit to the customer on a second day, the step of identifying including the step of determining whether a lag time between the first time window and the second time window is greater than a threshold lag time; (5) allowing the user to request that the delivery service make the second delivery vehicle visit to the customer on the second day within the second time window; (6) scheduling the first delivery vehicle visit to be made to the customer on the first day within the first time window; and (7) scheduling the second delivery vehicle visit to be made to the customer on the second day within the second time window. In a preferred embodiment of the invention, the steps above are executed in a real time computing environment.

In a preferred embodiment of the invention, the first delivery vehicle visit is a pickup; and the second delivery vehicle visit is a delivery. More specifically, the first delivery vehicle visit is preferably a pickup of a load of laundry to be cleaned; and the second delivery vehicle visit is a delivery of the load of laundry that should be scheduled to be made after the load of laundry has been cleaned. Accordingly, in a preferred embodiment of the invention, the predetermined threshold lag time referenced above is determined based, at least in part, on the estimated time that it would take to clean the laundry.

A further preferred embodiment of the invention comprises a system and method for scheduling customer visits to a customer. A customer visit is defined as a visit to a customer to perform a service, such as picking up items from the customer, delivering items to the customer, or both picking items up from and delivering items to the customer. Such a service may also include a service to be performed at the customer's residence, such as maintenance work or work related to the installation of a product for the customer (e.g., installation of cable TV service). Such a service may also include work that needs to be performed according to a periodic schedule, such as lawn maintenance or pool cleaning.

In this embodiment of the invention, the system is configured for performing the steps of: (1) receiving a single request from a user that a first customer visit be made to the customer within a particular time window on a first day, and that a second customer visit be made to the customer within the particular time window on a second day; (2) determining whether to schedule the first customer visit within the particular time window on the first day; (3) determining whether to schedule the second customer visit within the particular time window on the second day; (4) in response to a combination of: (a) the request, and (b) a determination in Step (2) that the first customer visit should be scheduled within the particular time window on the first day, scheduling the first customer visit to be made within the particular time window on the first day; and (5) in response to a combination of: (a) the request, and (b) a determination in Step (3) that the second customer visit should be scheduled within the particular time window on the second day, scheduling the second customer visit to be made within the particular time window on the second day. In a preferred embodiment of the invention, Step (2) above includes the step of determining whether it would be possible to make the first customer visit within the particular time window on the first day. Furthermore, Step (3) preferably includes determining whether it would possible to make the second customer visit within the particular time window on the second day.

A further preferred embodiment of the invention also comprises a system and method for scheduling customer visits to a customer. This system is configured for performing the steps of: (1) receiving a request from a user that a first customer visit be made to the customer on a first day within a first time window, and that a second customer visit be made to the customer on a second day within a second time window; (2) determining whether to schedule the first customer visit to be made on the first day within the first time window; (3) determining whether to schedule the second customer visit to be made on the second day within the second time window; (4) in response to a combination of: (a) the request, and (b) a determination in Step (2) that the first customer visit should be scheduled within the first time window on the first day, scheduling the first customer visit to be made within the first time window on the first day; and (5) in response to a combination of: (a) the request, and (b) a determination in Step (3) that the second customer visit should be scheduled within the second time window on the second day, scheduling the second customer visit to be made within the second time window on the second day; and wherein Step (3) of determining whether to schedule the second customer visit within the second time window on the second day includes determining whether a lag time between the first time window on the first day and the second time window on the second day is greater than a predetermined threshold lag time.

Yet another preferred embodiment of the invention comprises a system and method for scheduling customer visits to a customer, the system being configured for performing the steps of: (1) identifying a time window in which it would be possible to make a customer visit to the customer on a particular day; (2) allowing a user to request that the customer visit be made to the customer within the time window on the particular day; (3) allowing the user to specify that the user wishes to schedule a periodic series of customer visits that includes the first customer visit and one or more additional customer visits, each customer visit within the periodic series to be made on a different day, but within the particular time window; (4) allowing the user to specify a schedule for the series of customer visits; (5) scheduling the first customer visit; (6) using a first set of scheduling information to determine whether the delivery service can make each of the additional requested customer visits; and (7) in response to determining that, based on the first set of scheduling information, the delivery service can make each of the additional requested customer visits, tentatively scheduling each of the additional requested customer visits.

Additional embodiments of the invention include a computer-readable medium that includes computer-executable instructions for executing the various steps that the systems and methods described above are configured to perform.

BRIEF DESCRIPTION OF THE DRAWINGS

Figure 1:
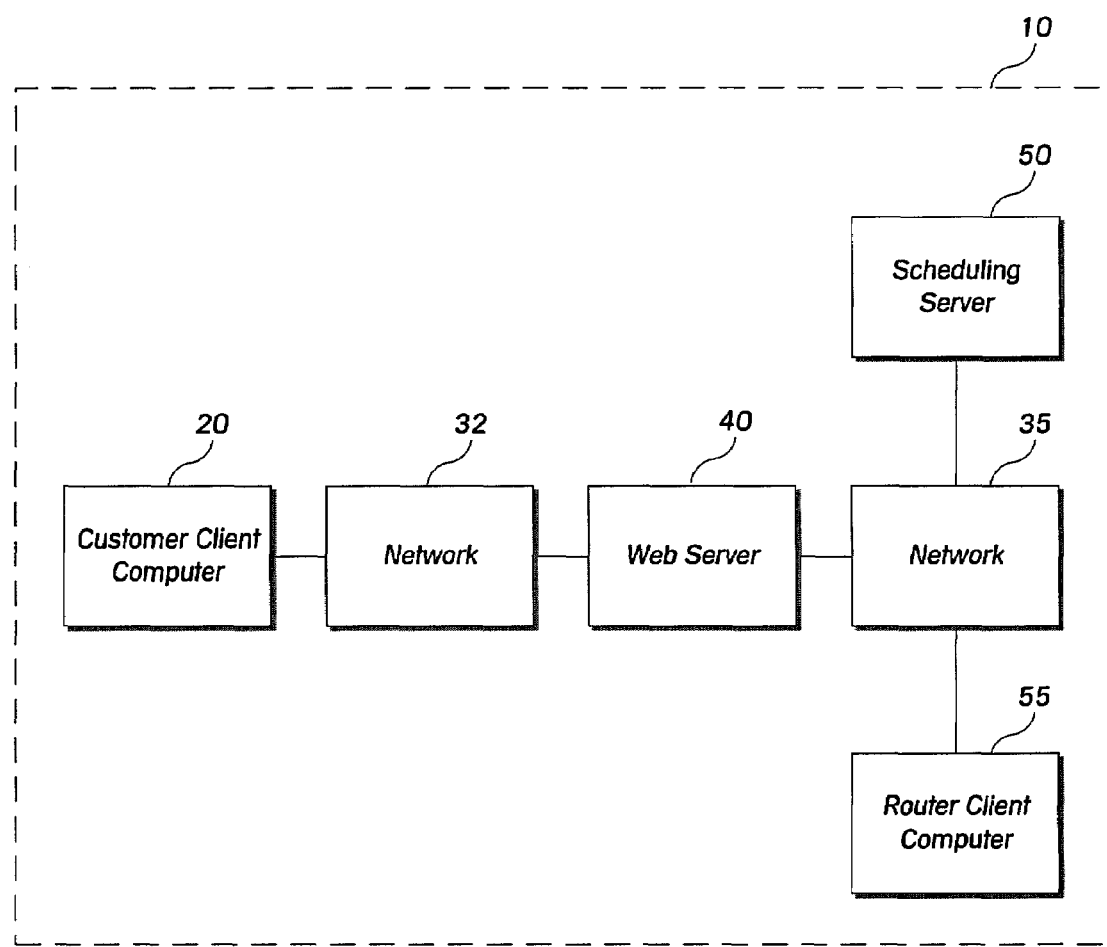

Having thus described the invention in general terms, reference will now be made to the accompanying drawings, which are not necessarily drawn to scale, and wherein:

FIG. 1 is a block diagram of a system according to a preferred embodiment of the current invention.

Figure 2:
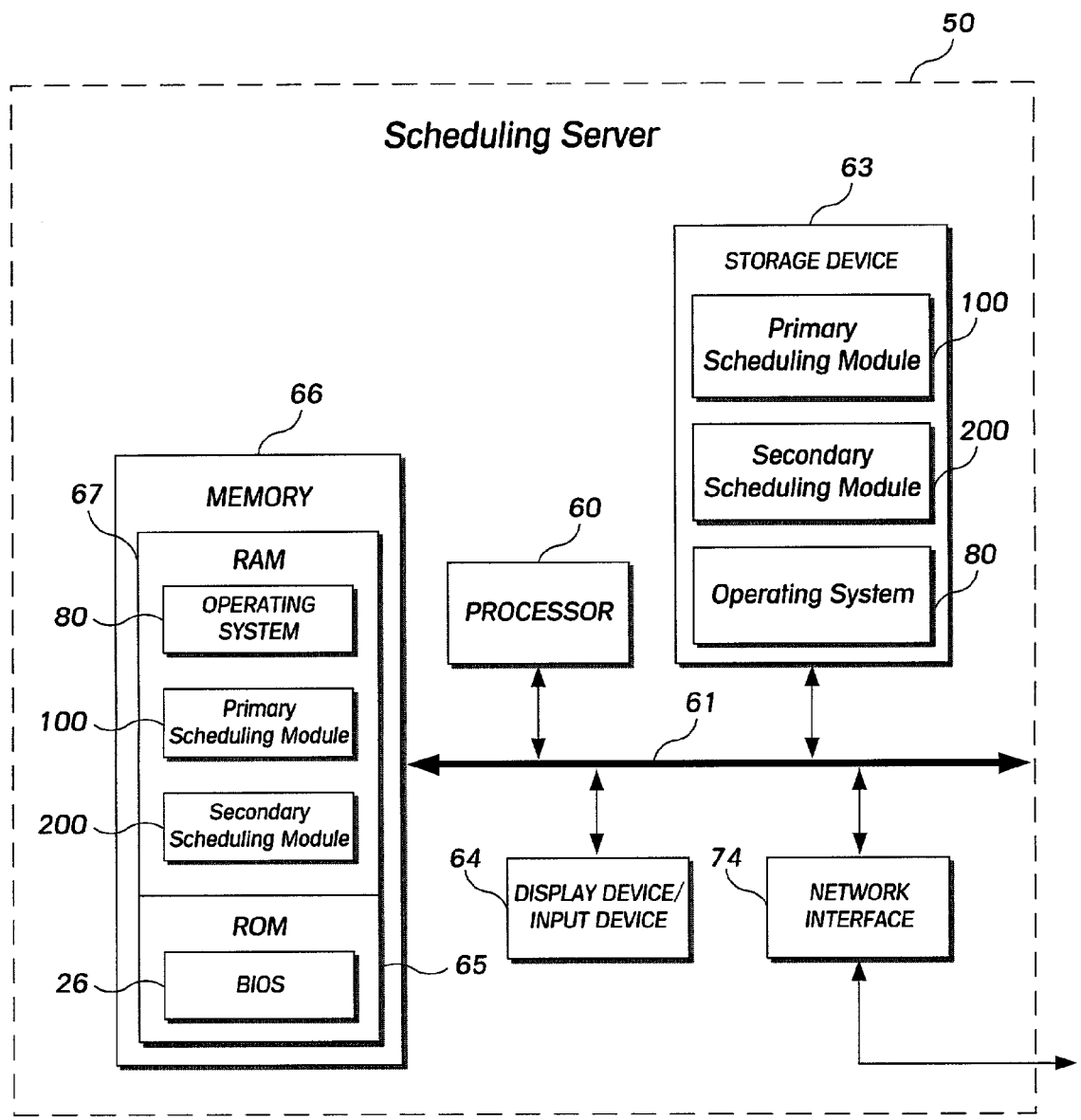

FIG. 2 is a block diagram of a Scheduling Server according to a preferred embodiment of the current invention.

Figure 3A:
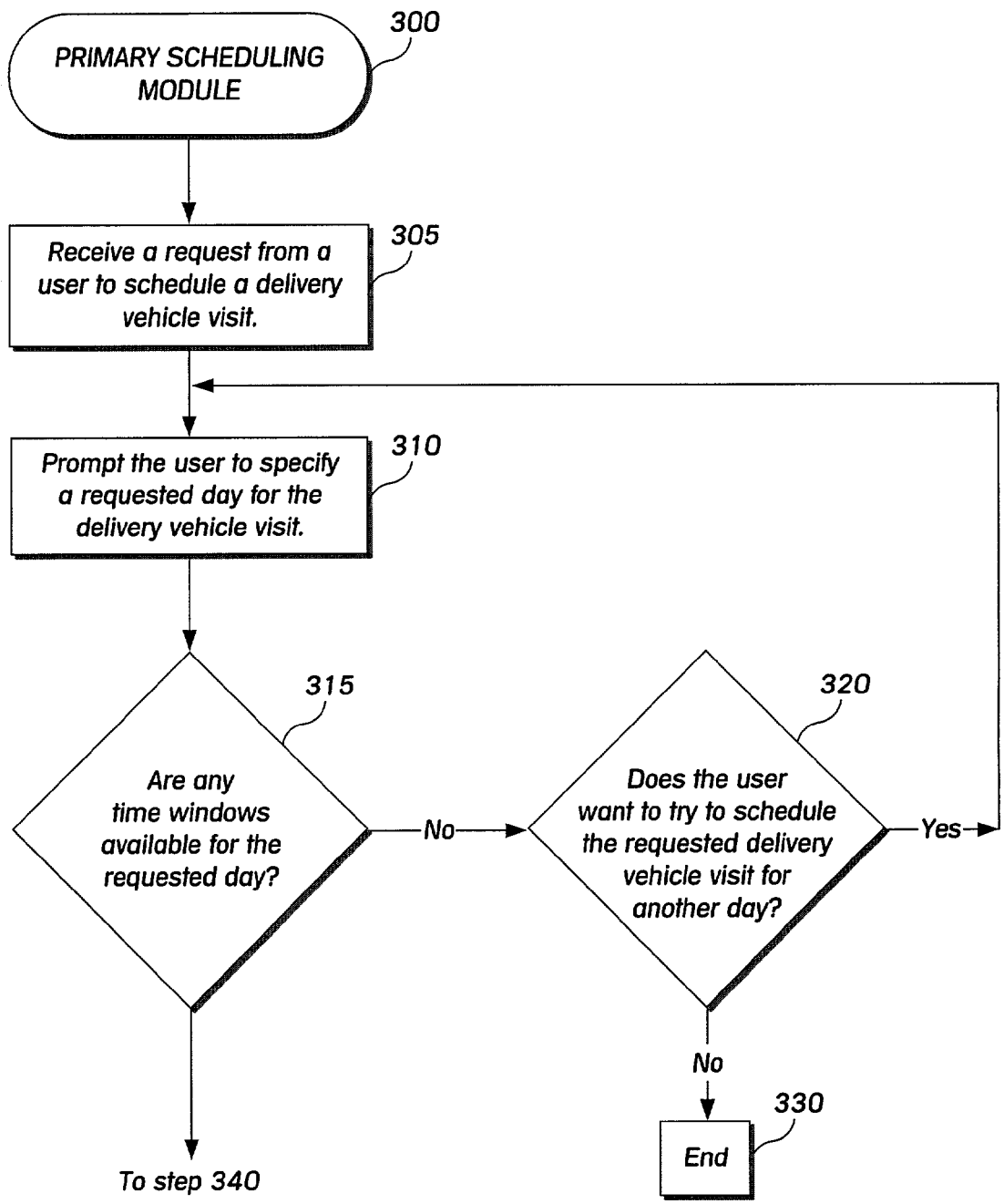
Figure 3B:
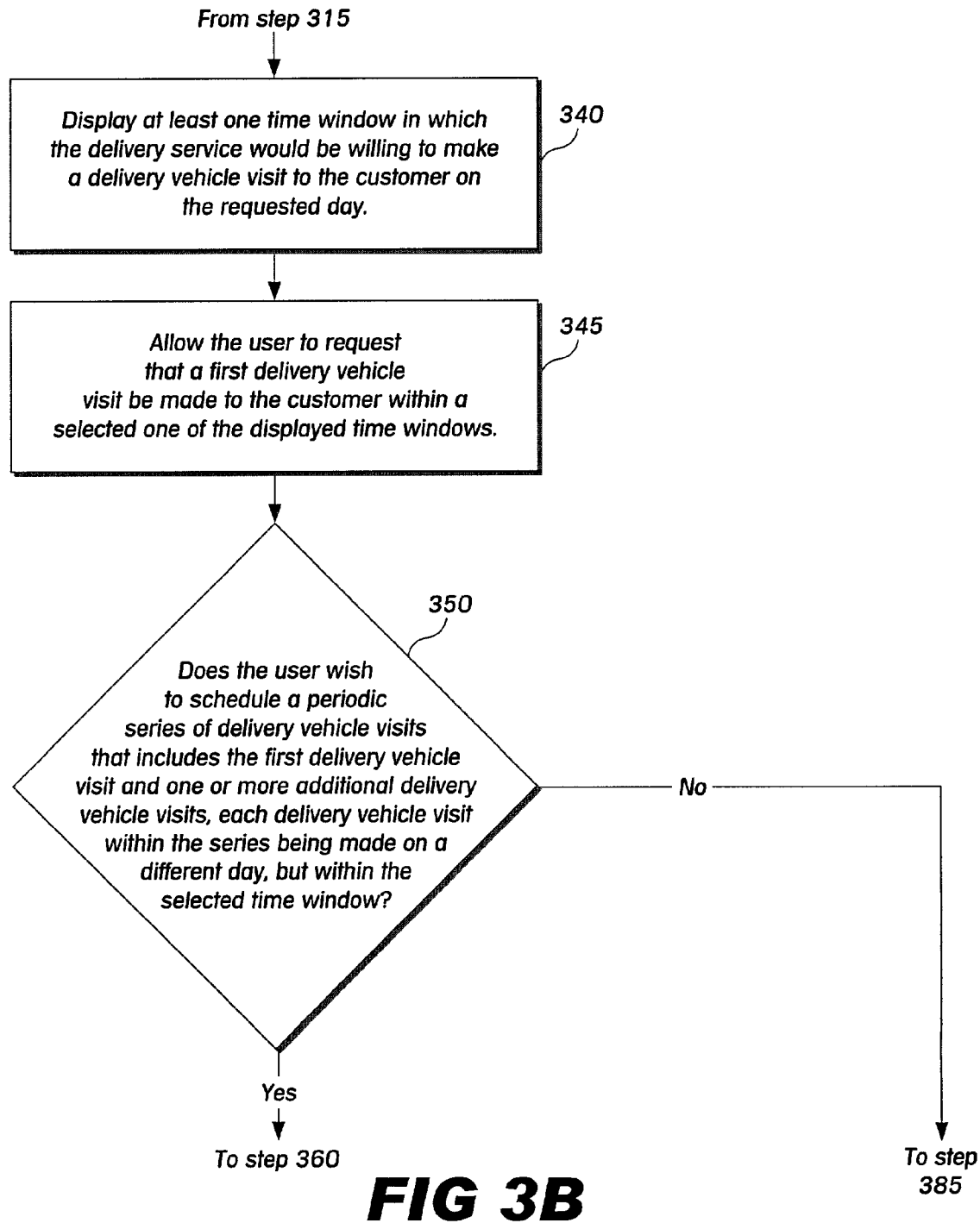
Figure 3C:
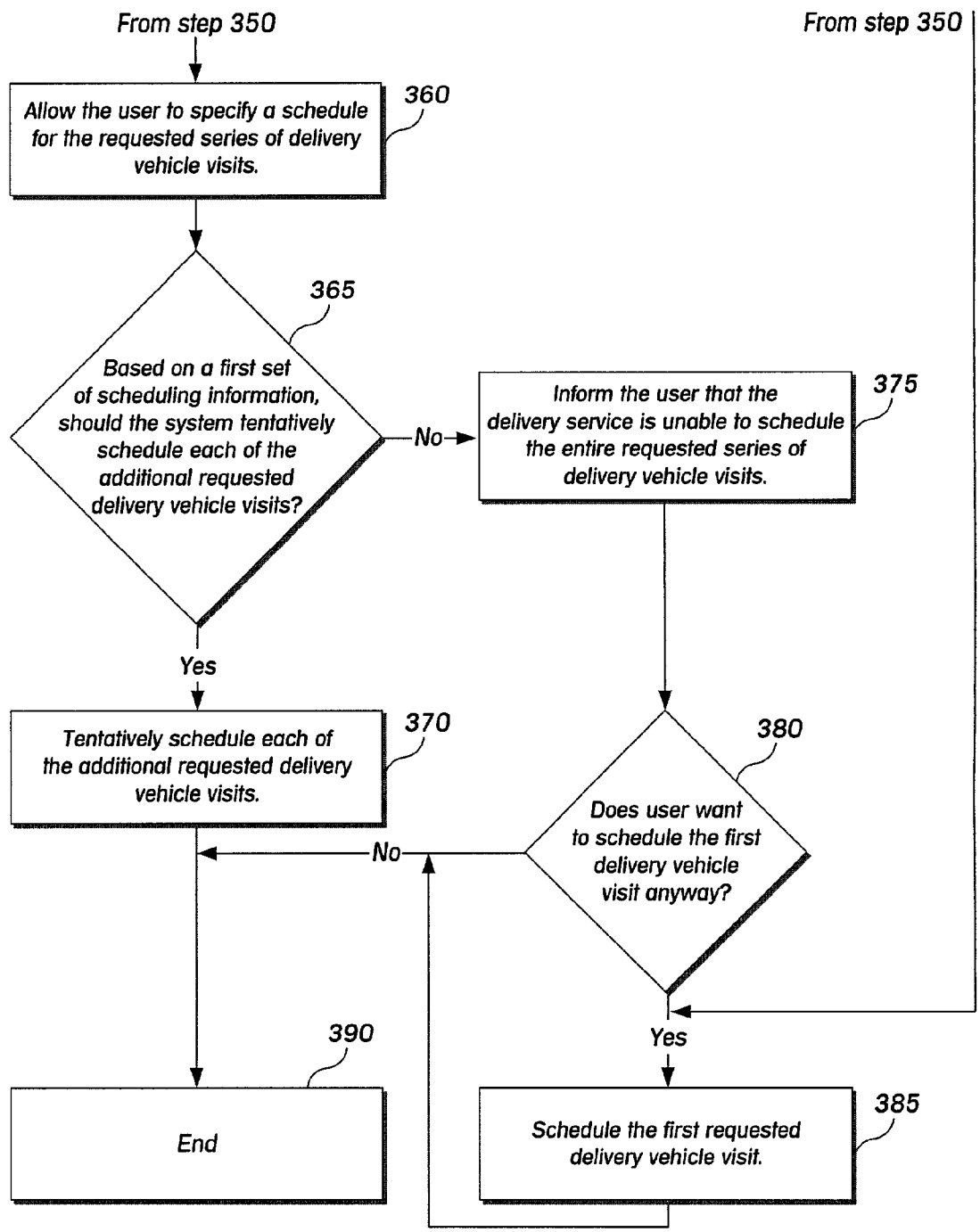

FIGS. 3A–3C depict a flowchart that generally illustrates a primary scheduling module according to a preferred embodiment of the current invention.

Figure 4A:
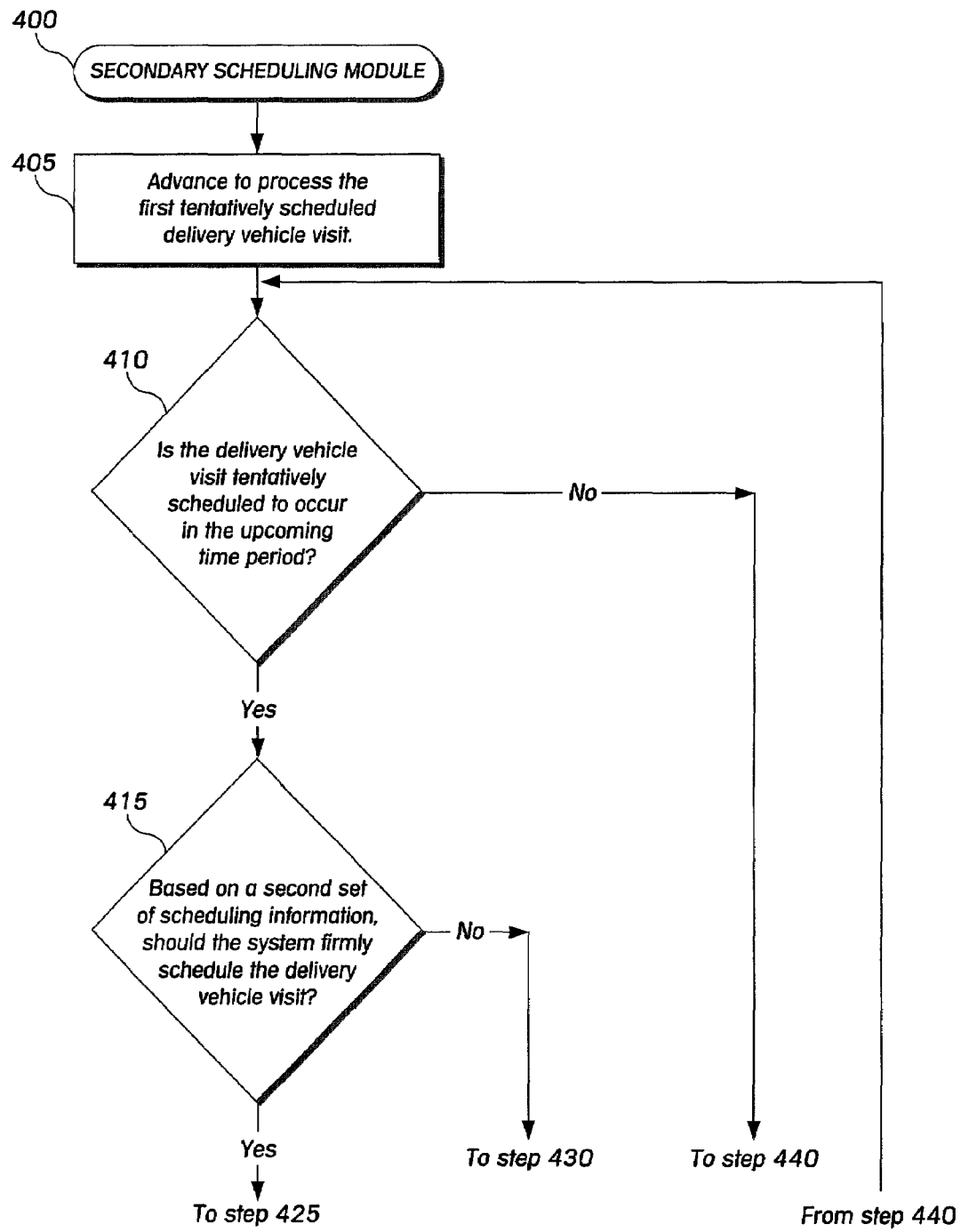
Figure 4B:
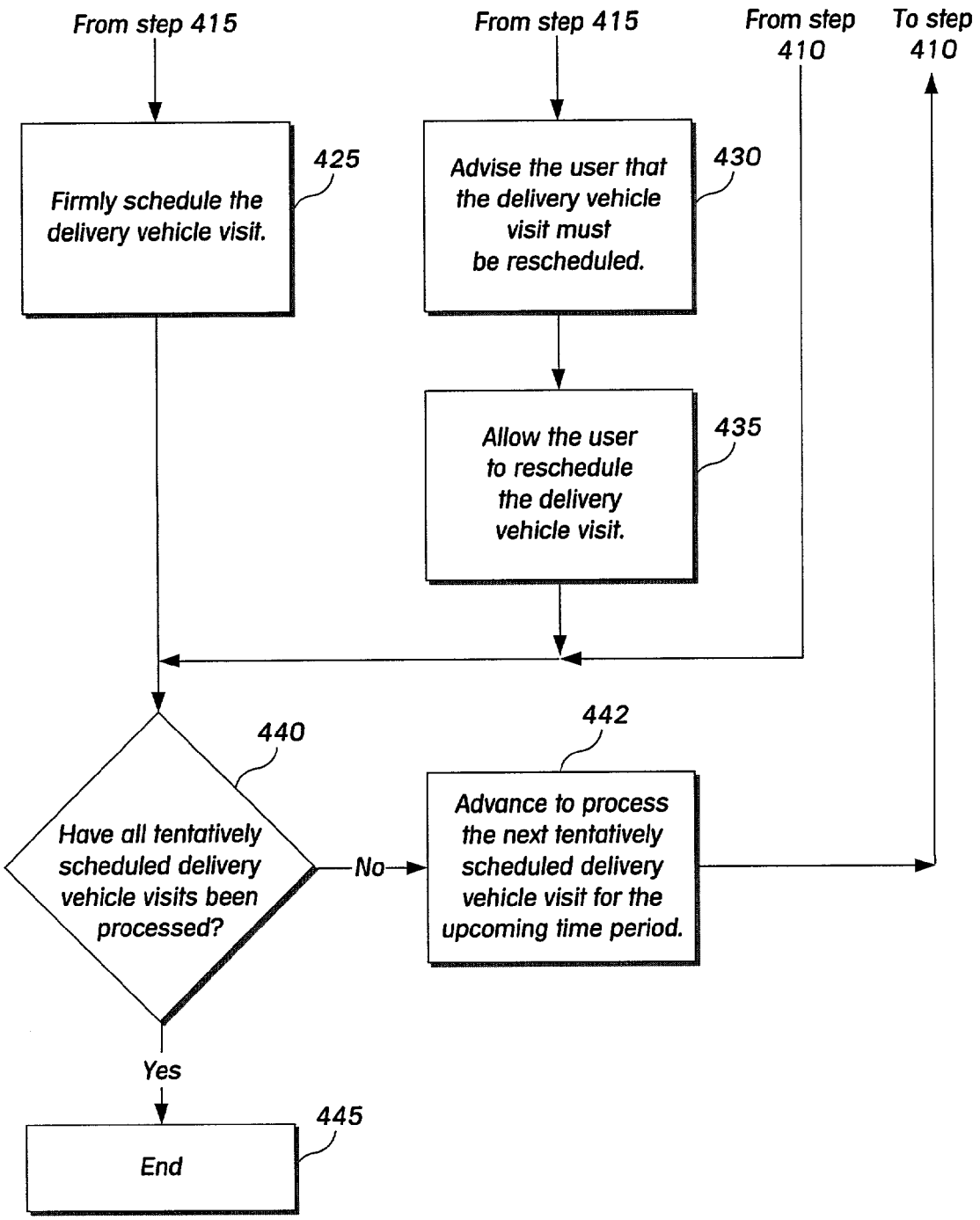

FIGS. 4A and 4B depict a flowchart that generally illustrates a secondary scheduling module according to a preferred embodiment of the current invention.

Figure 5A:
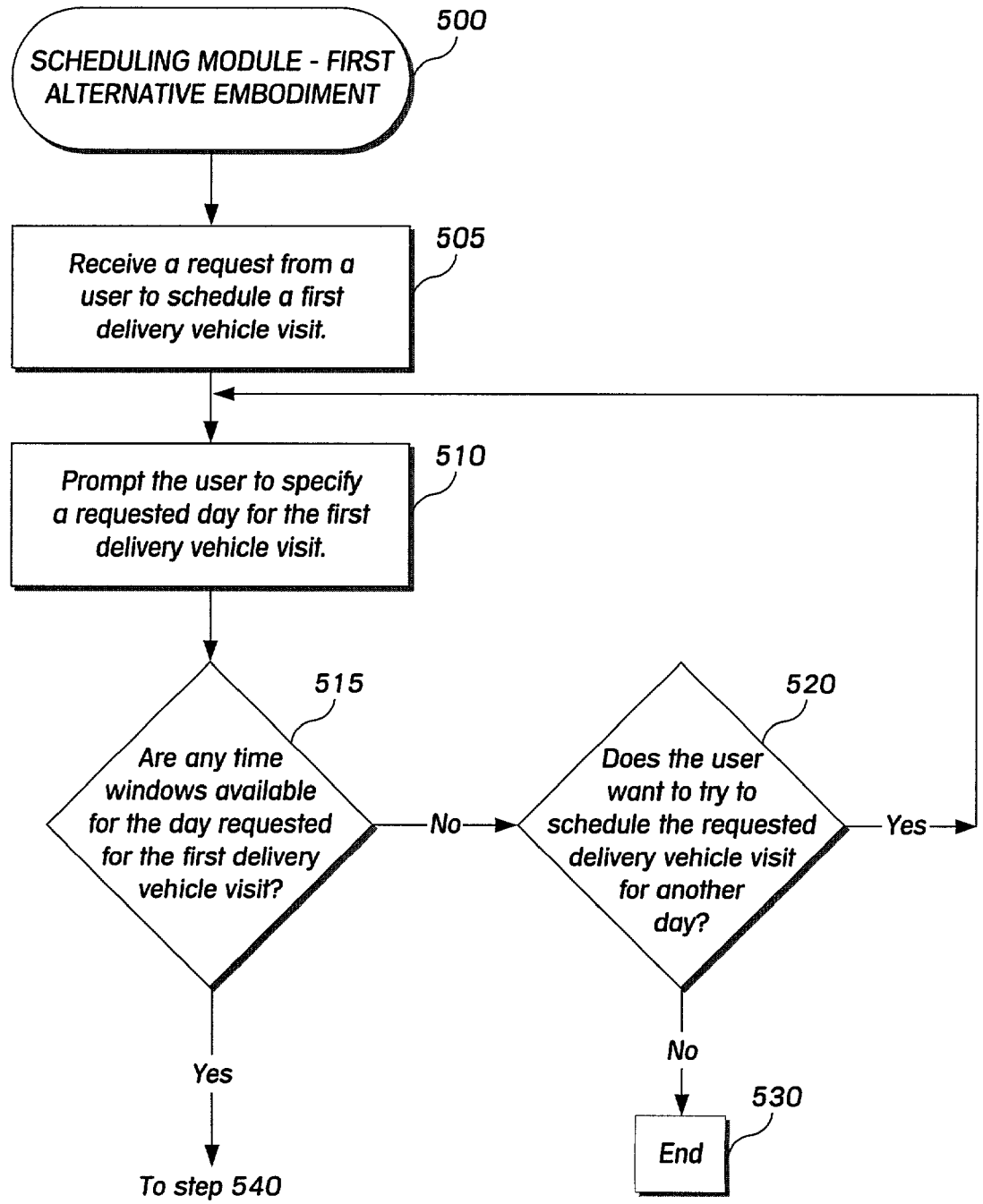
Figure 5B:
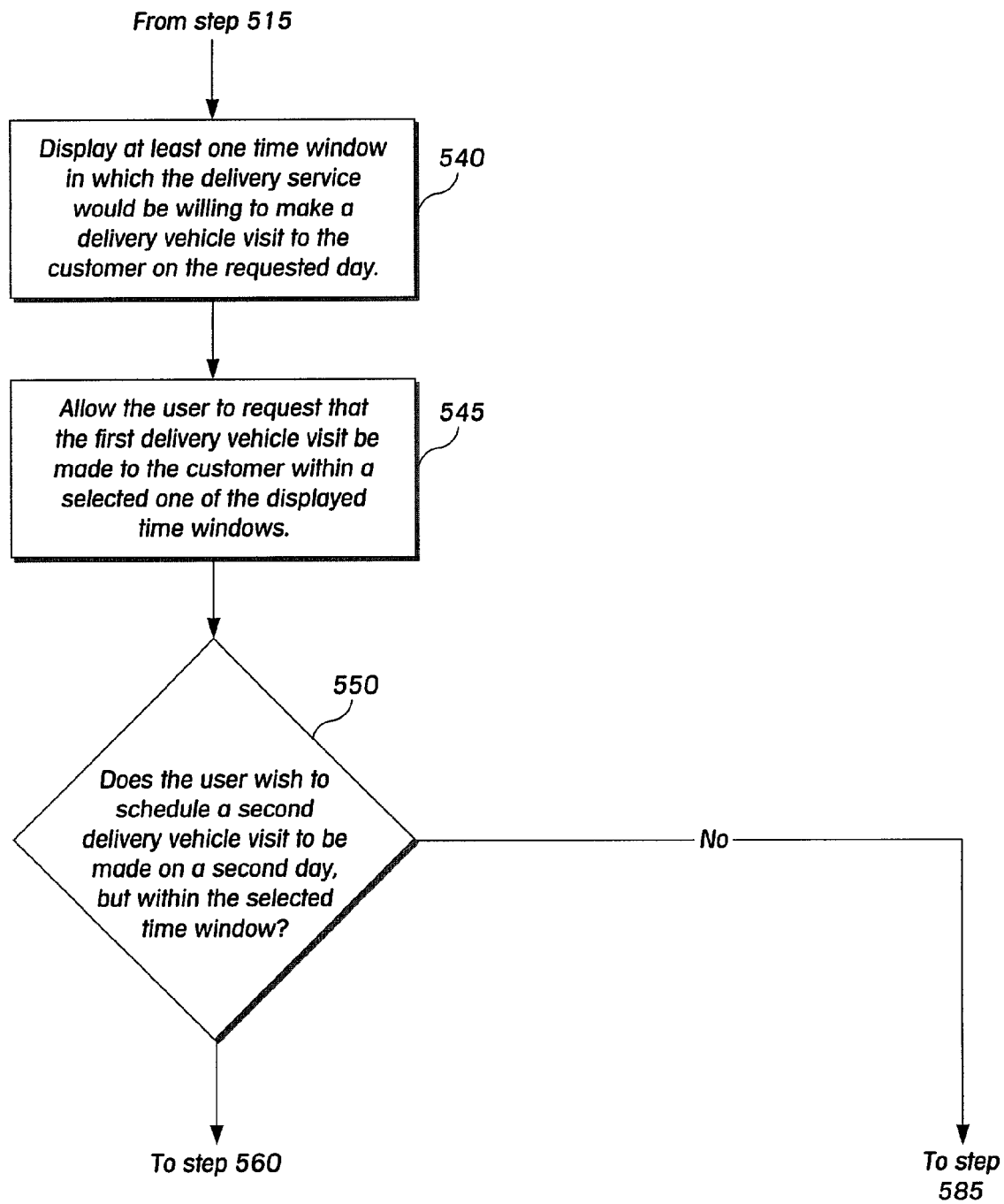
Figure 5C:
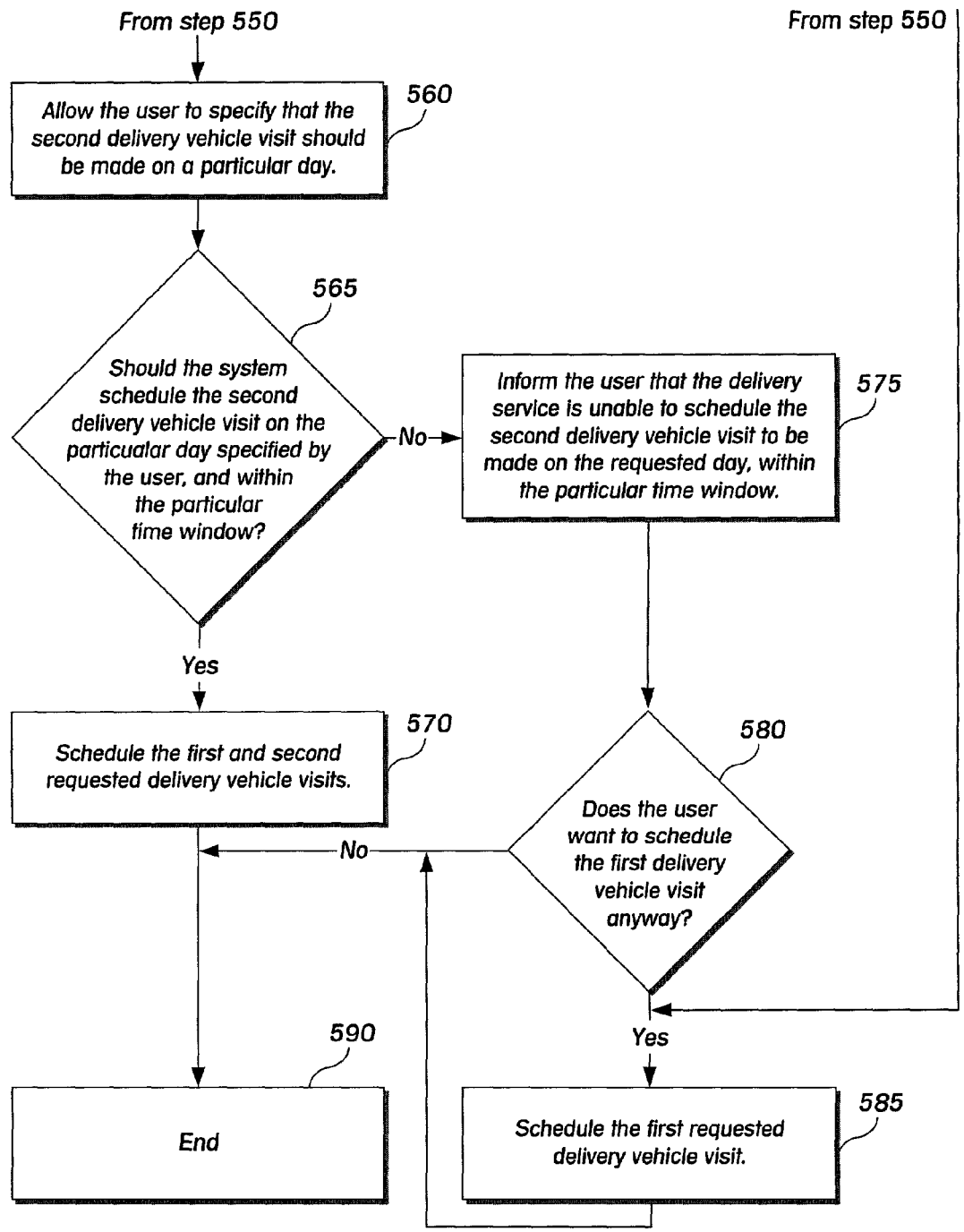

FIGS. 5A–5C depict a flowchart that generally illustrates a first alternative embodiment of a scheduling module according to a preferred embodiment of the current invention.

FIGS. 6A–6E are graphic illustrations of a scheduling window according to a preferred embodiment of the current invention.

Figure 7A:
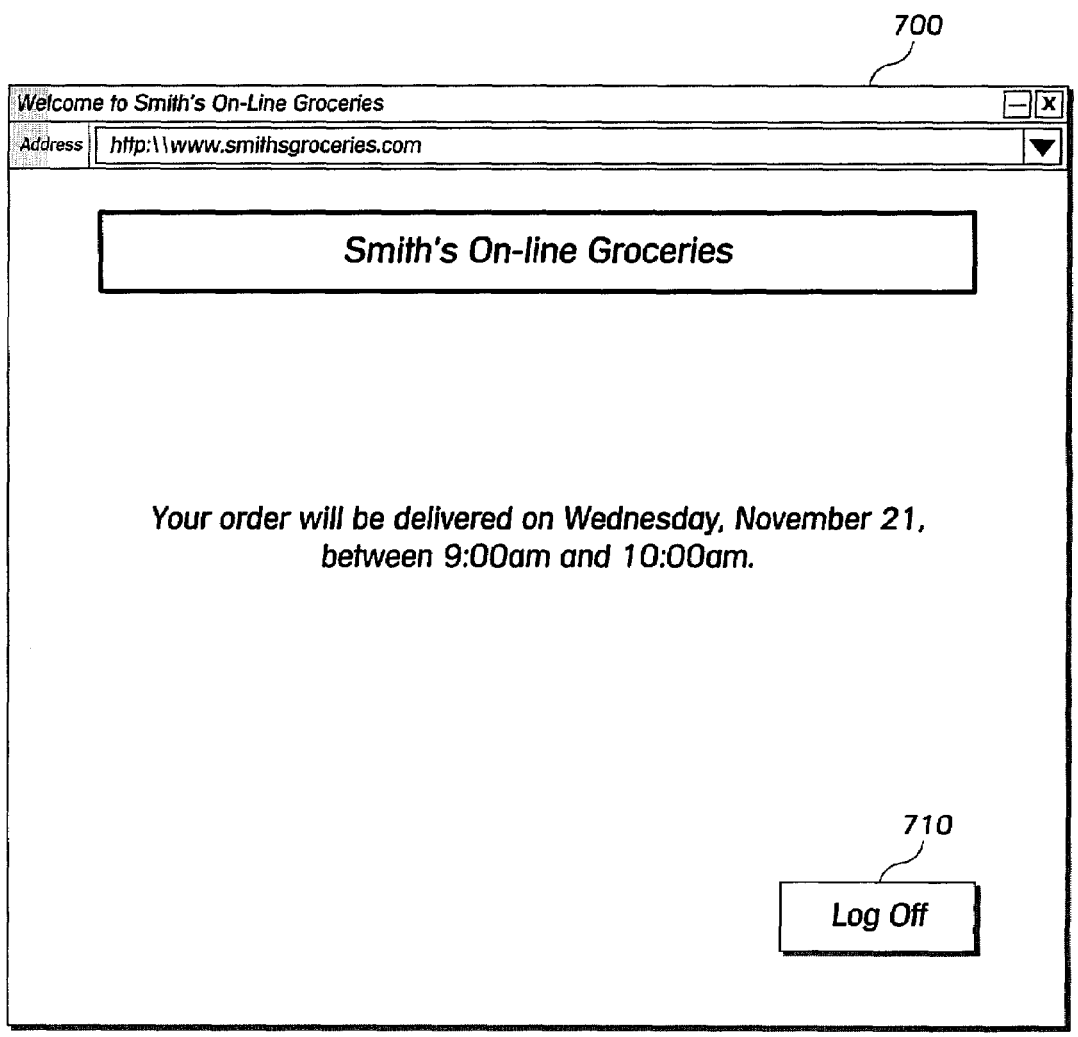
Figure 7B:
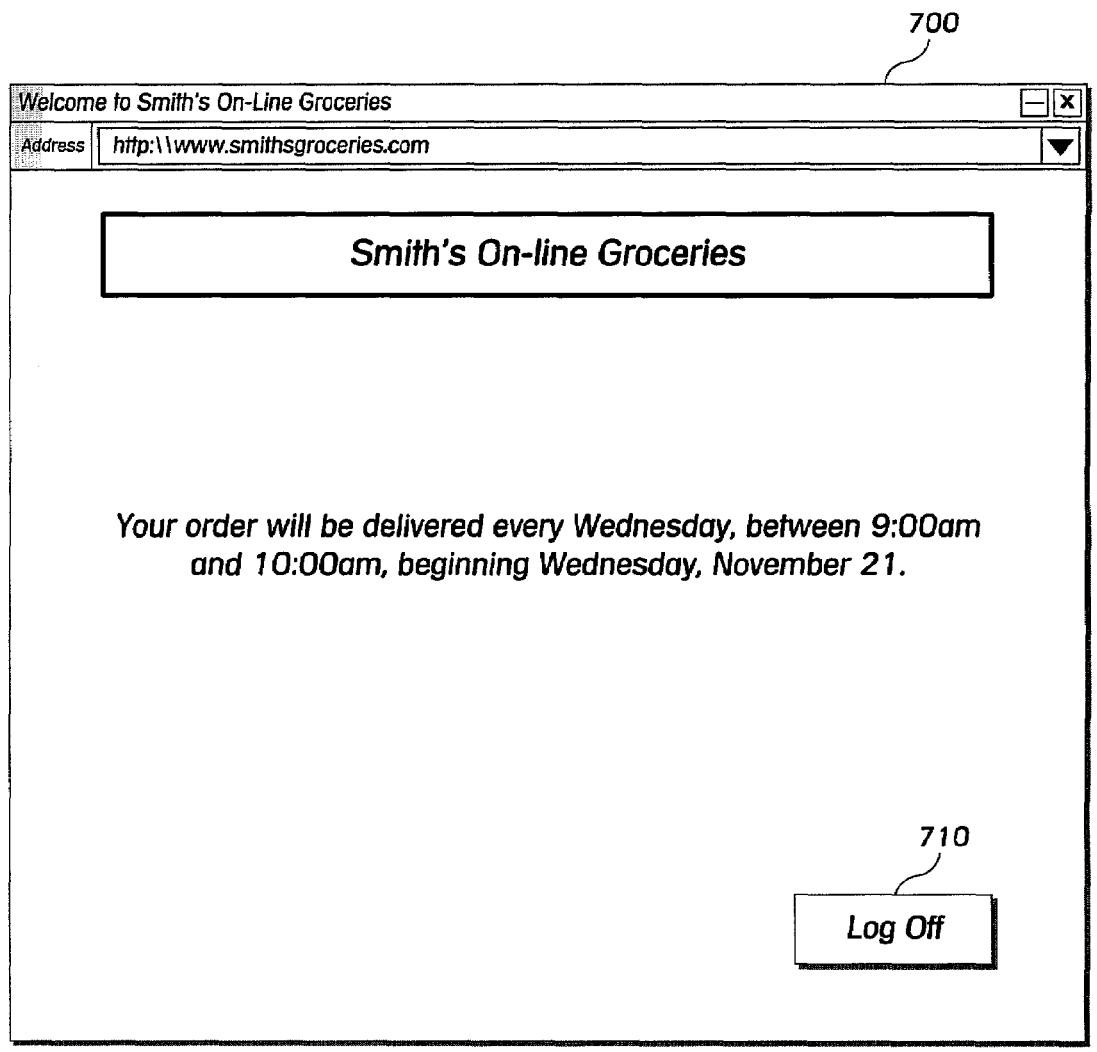

FIGS. 7A–7B are graphic illustrations of a confirmation window according to a preferred embodiment of the current invention.

Figure 8A:
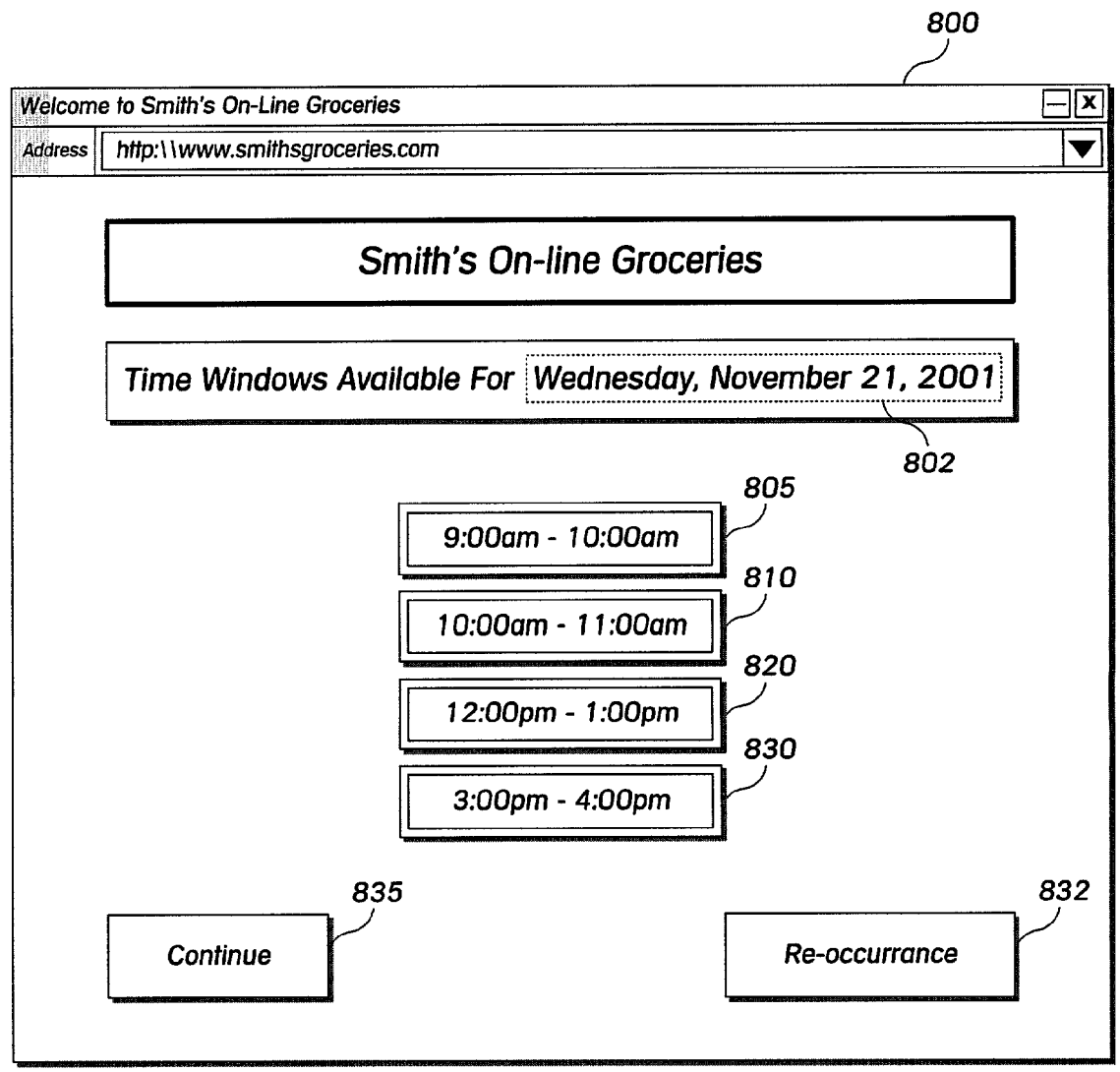
Figure 8B:
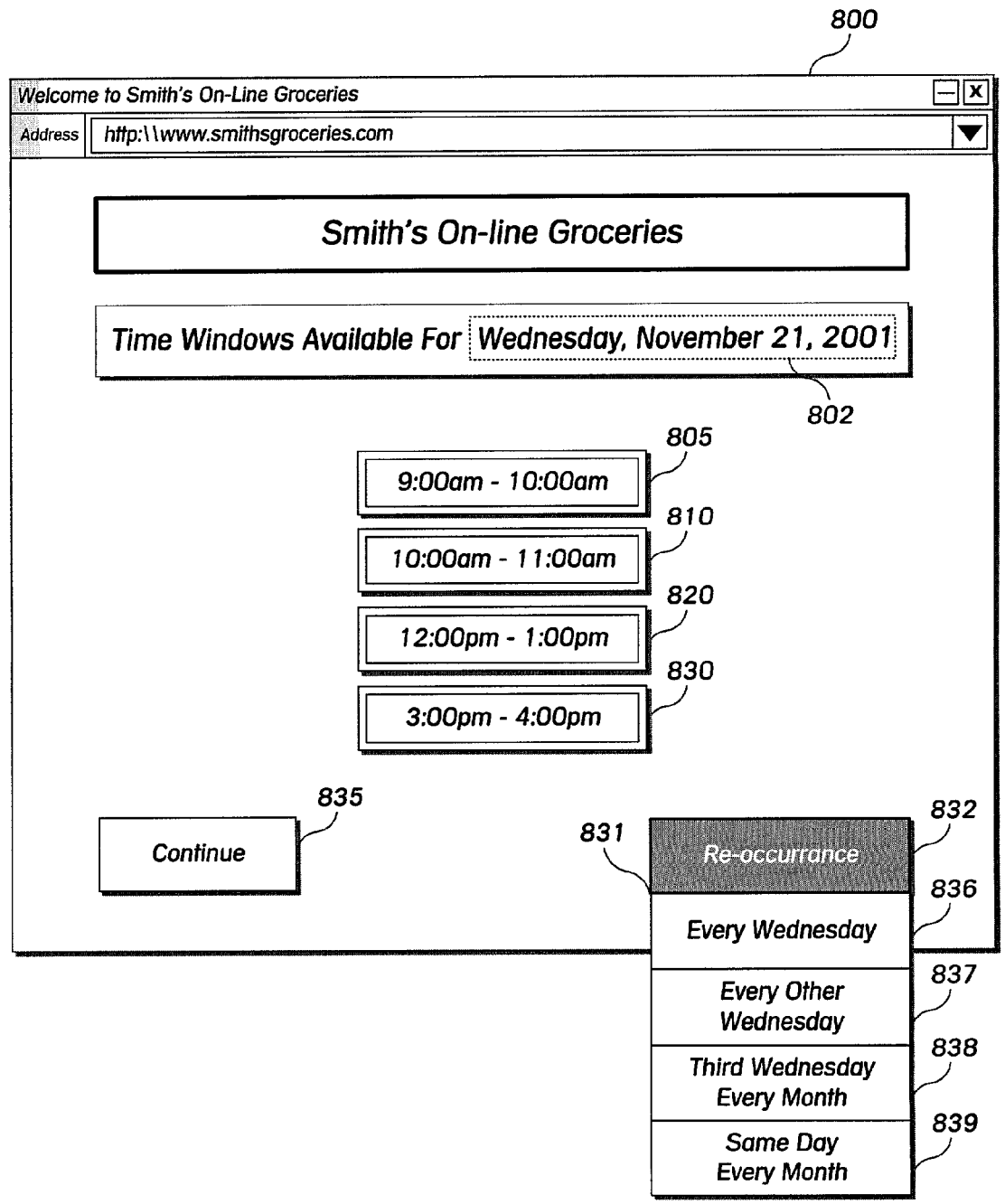

FIGS. 8A–8B are graphic illustrations of a scheduling window according to an alternative embodiment of the current invention.

FIGS. 9A–9D depict a flowchart that generally illustrates a second alternative embodiment of a scheduling module according to a preferred embodiment of the current invention.

Figure 10:
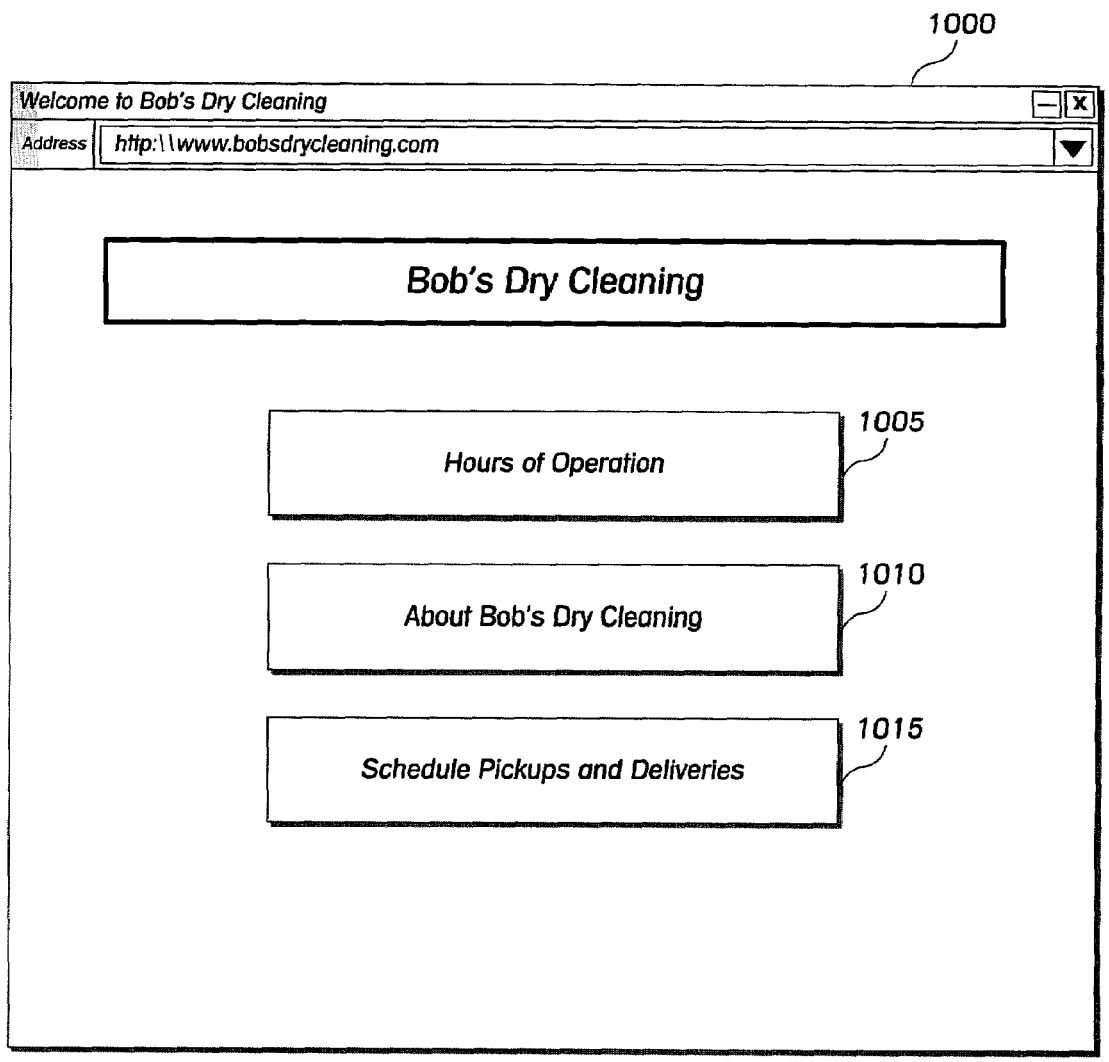

FIG. 10 is a graphic illustration of an exemplary home page of a system according to a preferred embodiment of the current invention.

Figure 11:
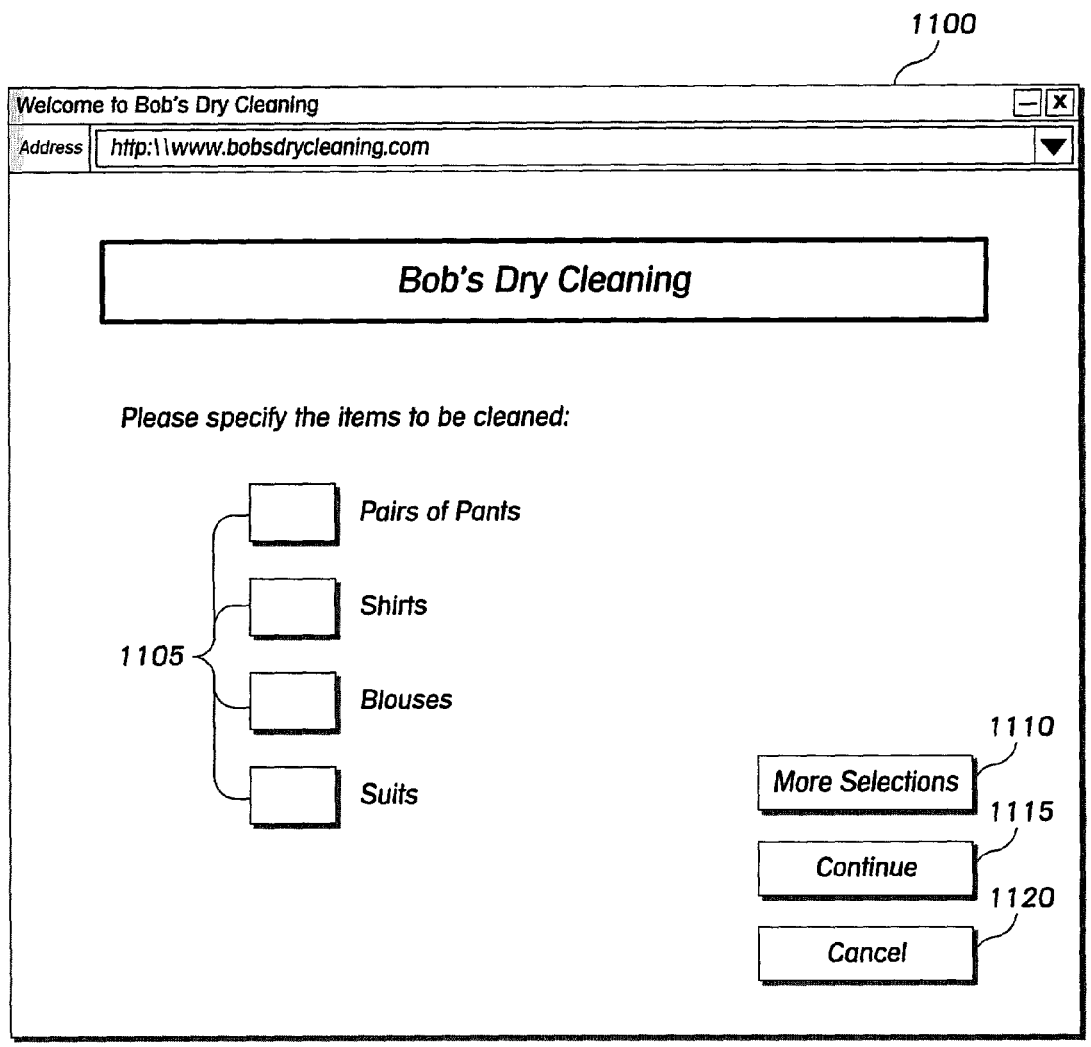

FIG. 11 is a graphic illustration of an order entry screen according to a preferred embodiment of the current invention.

Figure 12:
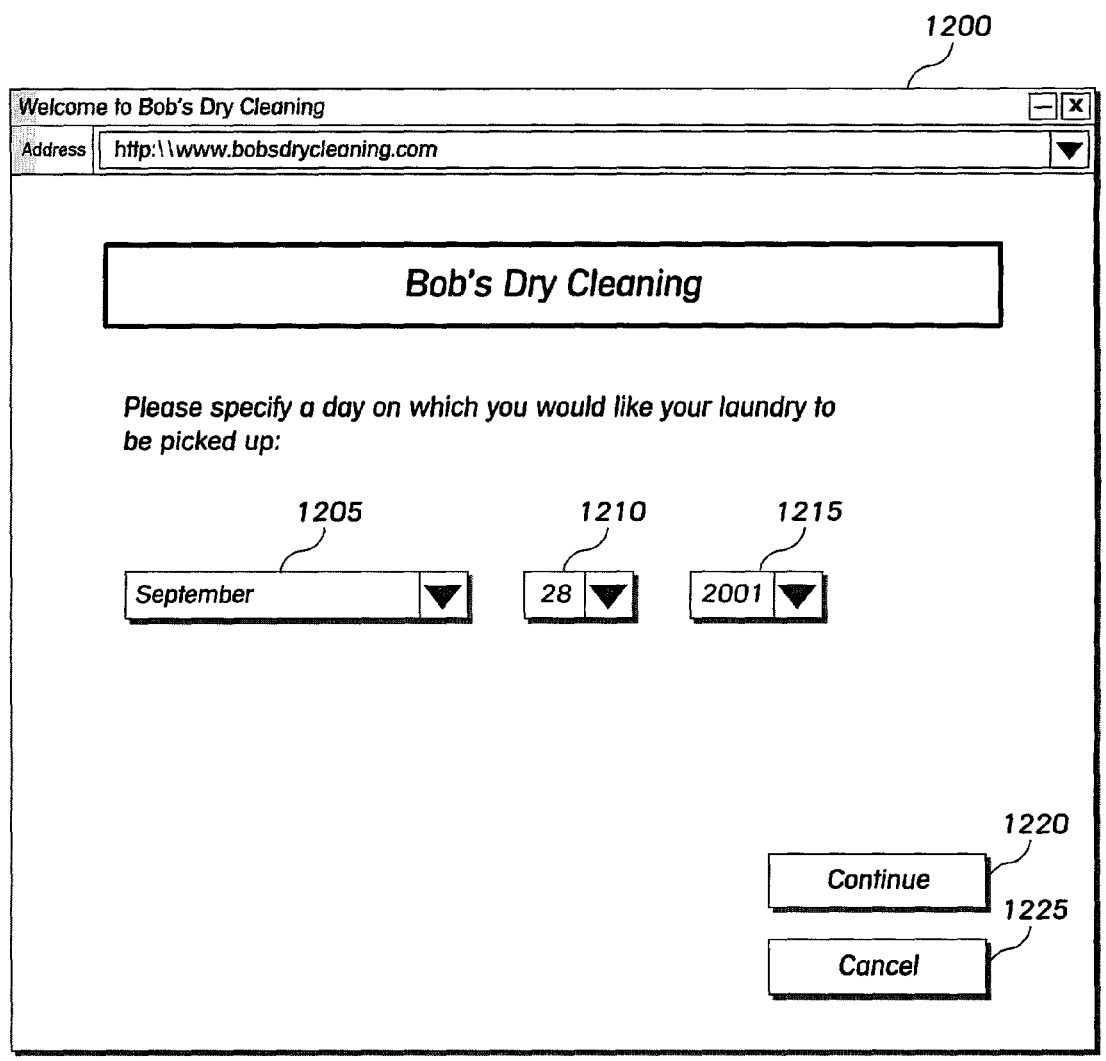

FIG. 12 is a graphic illustration of a pickup date scheduling screen according to a preferred embodiment of the current invention.

Figure 13:
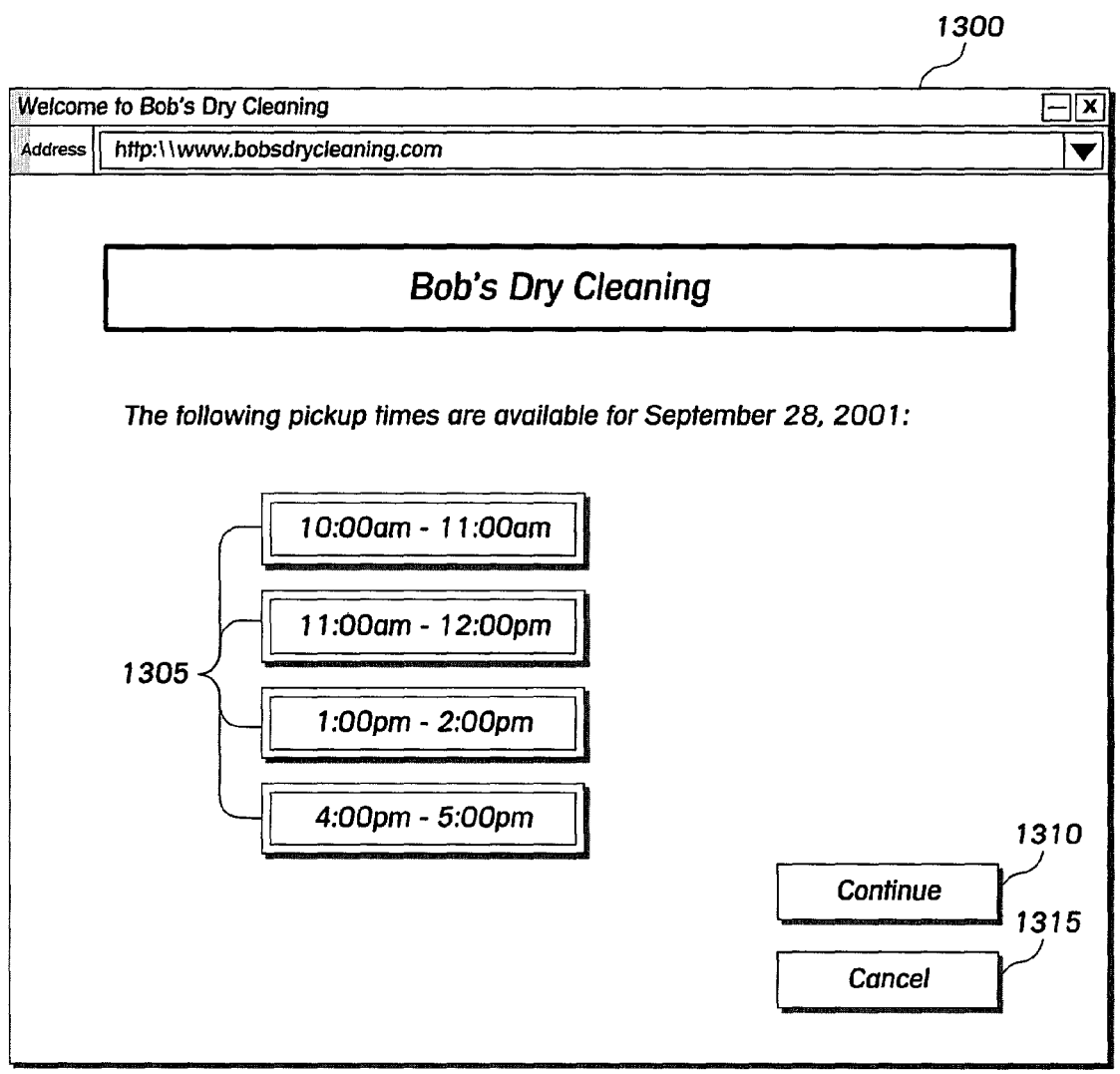

FIG. 13 is a graphic illustration of a pickup time window scheduling screen according to a preferred embodiment of the current invention.

Figure 14:
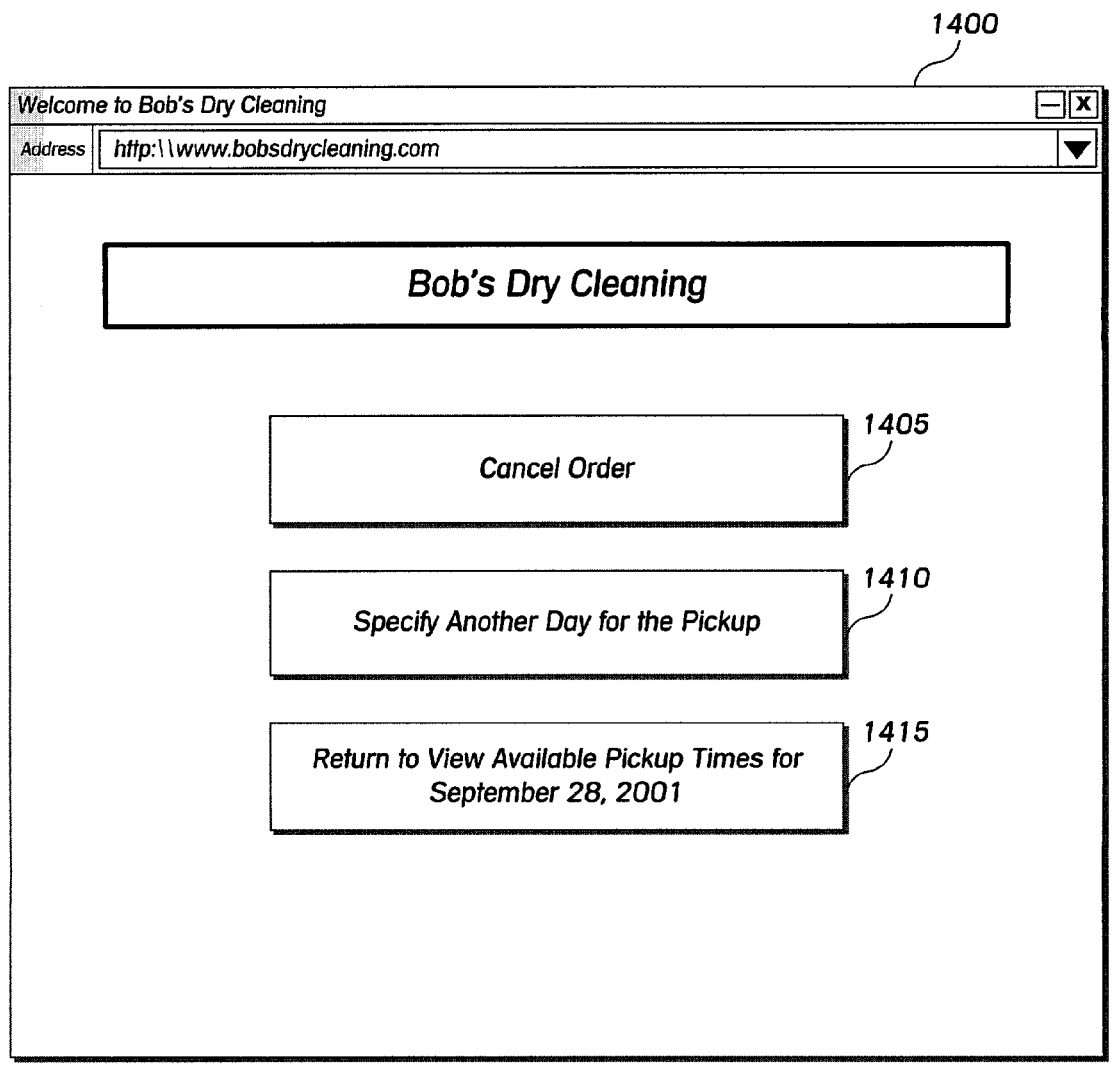

FIG. 14 is a graphic illustration of a pickup transition screen according to a preferred embodiment of the current invention.

Figure 15:
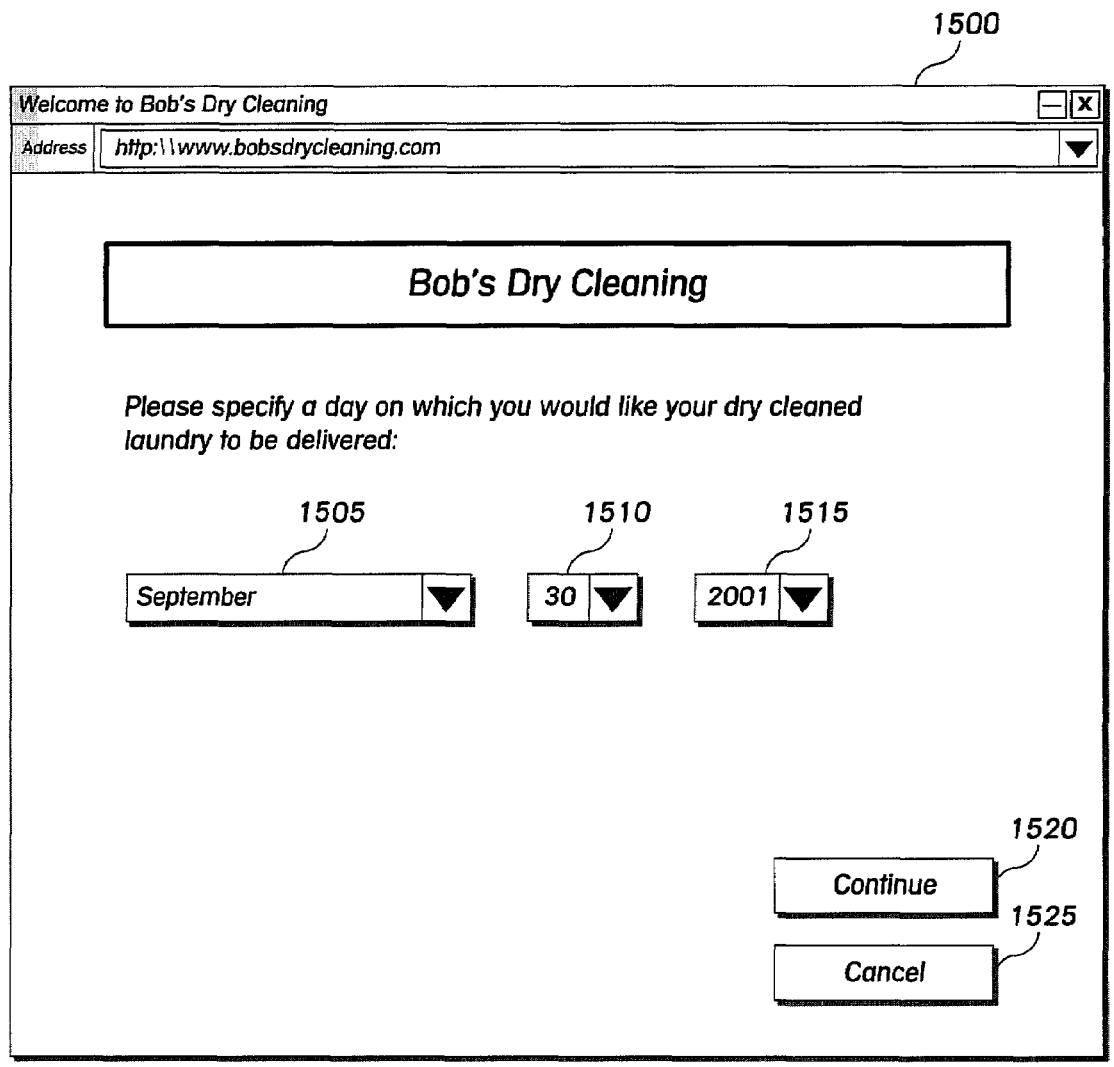

FIG. 15 is a graphic illustration of a delivery date scheduling screen according to a preferred embodiment of the current invention.

Figure 16:
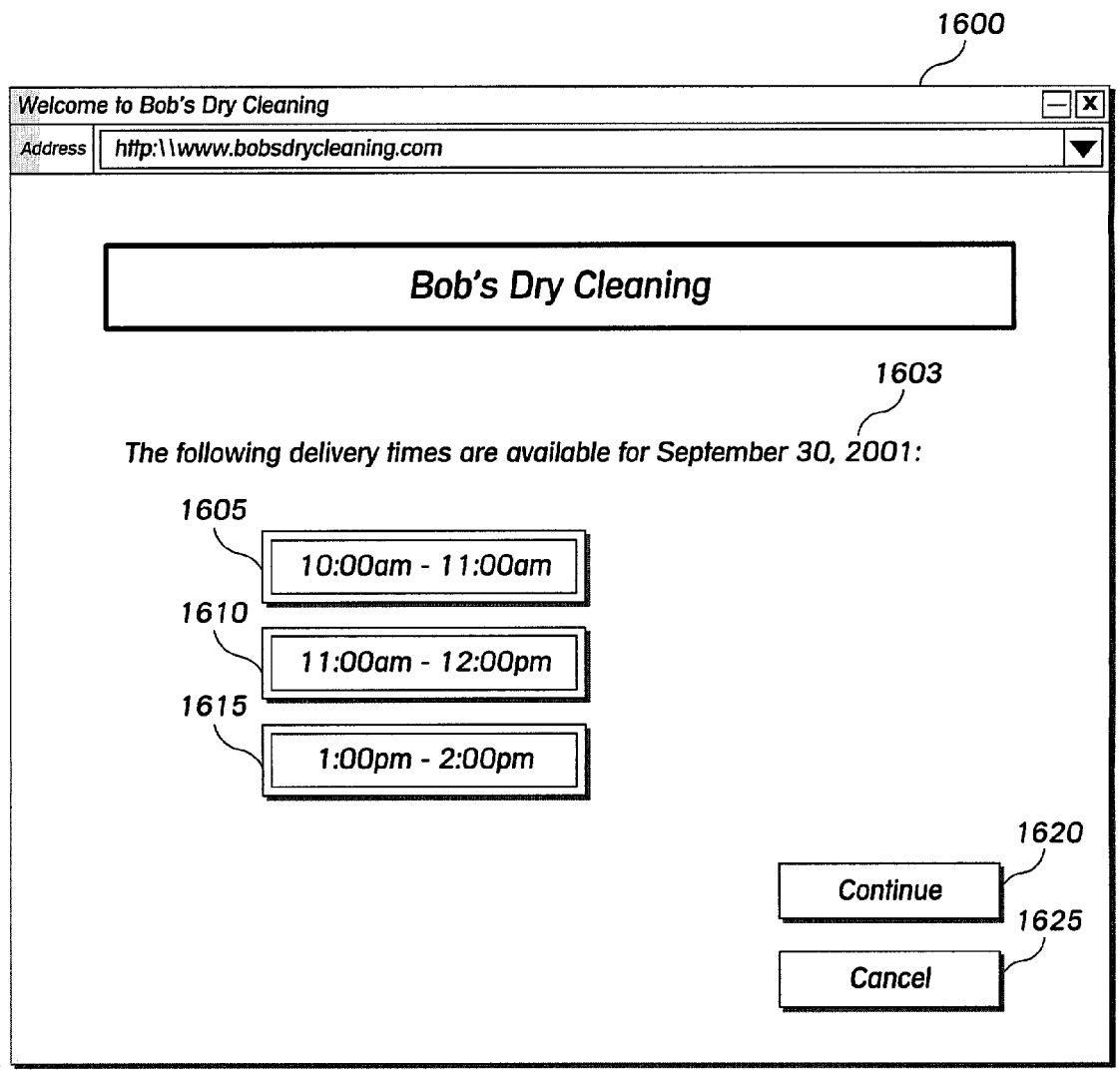

FIG. 16 is a graphic illustration of a delivery time window scheduling screen according to a preferred embodiment of the current invention.

Figure 17:
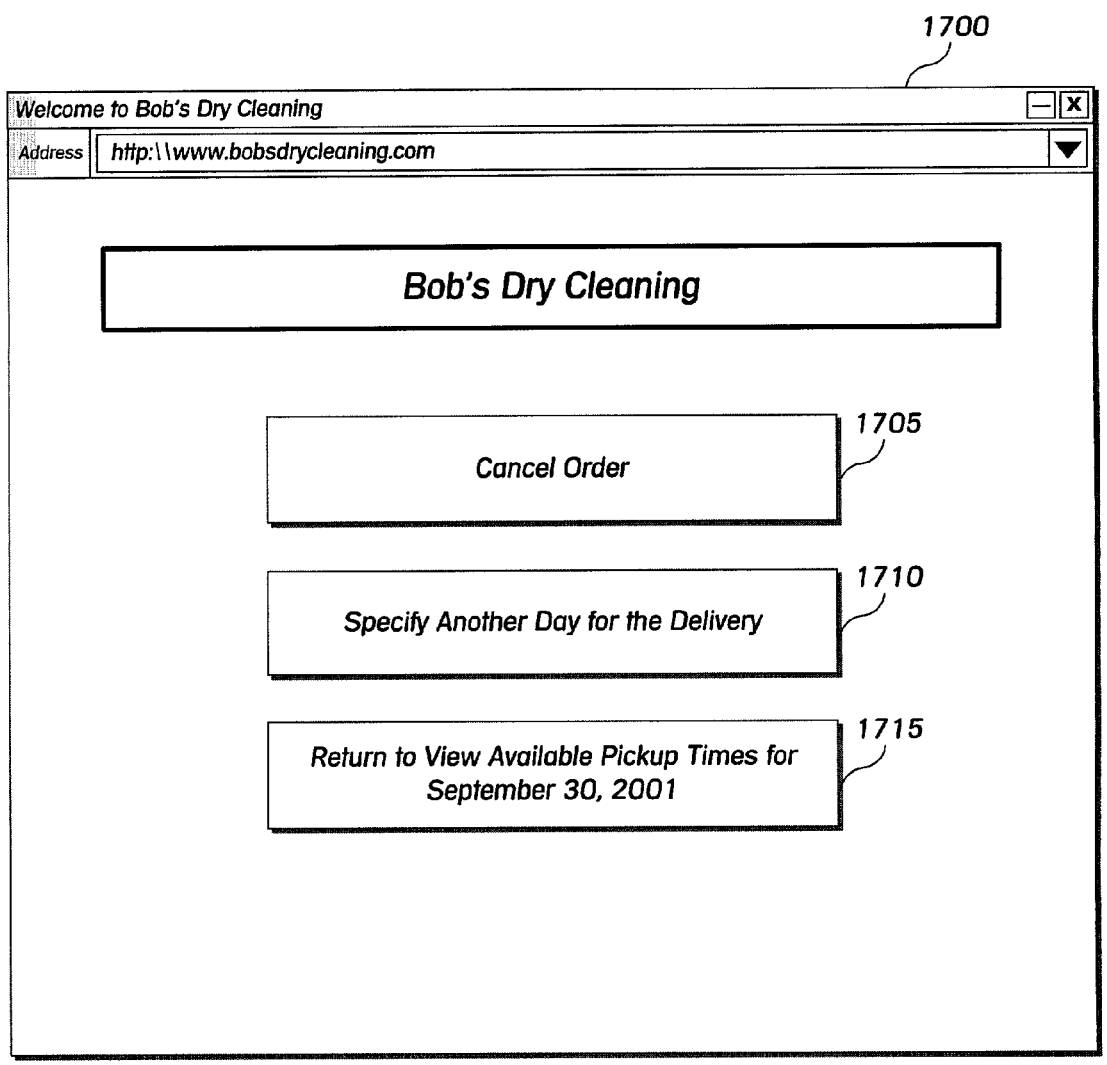

FIG. 17 is a graphic illustration of a delivery transition screen according to a preferred embodiment of the current invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. More particularly, the present invention may take the form of web-implemented computer software. Any suitable computer-readable storage medium may be utilized including hard disks, CD-ROMs, optical storage devices, or magnetic storage devices.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

System Architecture

FIG. 1 shows a block diagram of a scheduling system 10 in accordance with a preferred embodiment of the present invention. As may be understood from this figure, the scheduling system 10 includes a customer client computer 20, one or more computer networks 32, 35, a web server 40, a scheduling server 50, and a router client computer 55. As can be appreciated by one of ordinary skill in the art, the one or more computer networks 32, 35 facilitate communication between the customer client computer 20, the web server 40, the scheduling server 50, and the router client computer 55. These one or more computer networks 32, 35 may include any of a variety of types of computer networks such as the Internet, a private intranet, a public switch telephone network (PSTN), or any other type of network 32 known in the art. In a preferred embodiment of the invention, the network that provides a communication link between the customer client computer 20 and the web server 40 is the Internet, and the network 35 that provides a communications link between the web server 40, the scheduling server 50, and the router client computer 55 is a Local Area Network (LAN).

FIG. 2 shows a block diagram of an exemplary embodiment of the scheduling server 50 of FIG. 1. The scheduling server 50 includes a processor 60 that communicates with other elements within the scheduling server 50 via a system interface or bus 61. Also included in the scheduling server 50 is a display device/input device 64 for receiving and displaying data. This display device/input device 64 may be, for example, a keyboard or pointing device that is used in combination with a monitor. The scheduling server 50 further includes memory 66, which preferably includes both read only memory (ROM) 65 and random access memory (RAM) 67. The server's ROM 65 is used to store a basic input/output system 26 (BIOS), containing the basic routines that help to transfer information between elements within the scheduling server 50.

In addition, the scheduling server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for the scheduling server 50. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a primary scheduling module 100, and a secondary scheduling module 200. The primary scheduling module 100 and secondary scheduling module 200 control certain aspects of the operation of the scheduling server 50, as is described in more detail below, with the assistance of the processor 60 and an operating system 80.

Also located within the scheduling server 50 is a network interface 74, for interfacing and communicating with other elements of a computer network. It will be appreciated by one of ordinary skill in the art that one or more of the scheduling server 50 components may be located geographically remotely from other scheduling server 50 components. Furthermore, one or more of the components may be combined, and additional components performing functions described herein may be included in the scheduling server 50.

Definitions

As used in this specification, the term "delivery vehicle visit" refers to a trip by a vehicle, such as a delivery vehicle, in which the vehicle either picks up items from a customer or delivers items to the customer. This term may also refer to a trip by a vehicle, such as a delivery vehicle, in which the vehicle both picks up items from, and delivers items to, a customer.

As used in this specification, the term "customer visit" refers to a visit to a customer to perform a service, such as picking up items from a customer, delivering items to a customer, or both picking items up from and delivering items to the customer. The service may also include, for example, services to be performed at the customer's residence. Such services may include, for example, maintenance work or work related to the installation of a product for the customer (such as the installation of cable TV service). Such services may also include work that needs to be performed according to a periodic schedule, such as lawn service work or pool cleaning.

The term "time window" refers to a discrete block of time during which a particular delivery vehicle visit may be scheduled. For example, a particular delivery vehicle visit may be scheduled to be made within a 9:00 am–10:00 am time window. In this example, the scheduled delivery vehicle visit should be made sometime between 9:00 am and 10:00 am.

The term "delivery service" refers to any entity that executes pickups or deliveries. One example of such an entity would be a dry cleaning business that picks up dirty laundry from, and delivers clean laundry to, a customer.

The term "user" refers to an individual who is using a computer system to schedule a delivery vehicle visit. This user may also be a customer of a particular delivery service. Accordingly, "user" and "customer" are often used interchangeably below.

The term "real-time" as applied to a scheduling system according to the present invention indicates that the system is configured to allow a user to issue a request that a particular event be scheduled, and that is also configured to process the request and display the results of the request to the user in a substantially immediate manner. Accordingly, when using a real-time scheduling system, a user would reasonably expect to enter a particular request, and to receive the results of the request without waiting for a significant period of time. Preferably, a real-time scheduling system would normally display the results of a user's request within 1 minute of receiving the request.

The term "real-time" as applied to executing a series of steps indicates that the steps are executed in a substantially immediate manner. Accordingly, when a system is executing a series of steps in real time, a user would reasonably expect the system to execute the steps while the user waits. Similarly, the user would reasonably expect the system to execute the steps in a reasonably short period of time. Preferably, a system executing a series of steps in real-time would normally execute the steps in 1 minute or less.

Introduction

As mentioned above, the current invention provides a scheduling system that allows a user to schedule, in real time, two or more delivery vehicle visits (or customer visits) in response to a single request. A preferred embodiment and various alternative embodiments of the invention are described in greater detail below.

Preferred Embodiment of the Invention

FIGS. 3A–3C, and 4A–4B provide an overview of the logical steps executed by a system and method according to a preferred embodiment of the invention. More particularly, FIGS. 3A–3C describe a primary scheduling module 300 that may be used to request, and tentatively schedule, a series of reoccurring delivery vehicle visits. Similarly, FIGS. 4A and 4B describe a secondary scheduling module 400 that may be later used to firmly schedule each tentatively scheduled delivery vehicle visit. The operation of the primary and secondary scheduling modules 300, 400 is discussed in detail below.

As noted above with regard to FIG. 1, in a preferred embodiment of the invention, the primary and secondary scheduling modules 300, 400 are executed by a scheduling server 50 that is connected to a web server 40 and a router client computer 55 via a network 35 such as a LAN. Furthermore, the web server 40 communicates with at least one customer client computer 20 via a network such as the Internet.

In a preferred embodiment of the invention, the primary and secondary scheduling modules 300, 400 are used to allow customers to schedule, in real time, reoccurring series of delivery vehicle visits to be made by a delivery service. For example, to schedule a pickup or series of reoccurring pickups, a customer typically enters his name, address, phone number, user id, or other identifying information on the preliminary screens of the delivery service's web site. The user then enters a date on which they would like a pickup to be made and, preferably, specifies the items to be picked up. The user then specifies, preferably using an input button on the delivery service's web site, that they would like to schedule the pickup. In response to this request, the system begins executing the primary scheduling module 300, which is configured for executing the steps shown in FIGS. 3A–3C.

Similarly, to schedule a delivery or reoccurring series of deliveries, a customer typically enters his name, address, phone number, user id, or other identifying information on the preliminary screens of the delivery service's web site. The user then selects items to be delivered by, for example, selecting the items from various display screens. The user then enters a request that the delivery be made on a certain date. In response to this request, the system begins executing the primary scheduling module 300, which, as noted above, is configured for executing the steps shown in FIG. 3A.

As shown in FIG. 3A, when executing the primary scheduling module 300, at Step 305, the system first receives a request from a user to schedule a delivery vehicle visit. The system then advances to Step 310 where it prompts the user to specify a requested day for the delivery vehicle visit. The system then determines, at Step 315, whether any time windows are available for the requested day. Stated differently, at Step 315, the system determines whether the delivery service would be willing to make a delivery vehicle visit to the customer within any time window on the requested day. In a preferred embodiment of the invention, the system makes this determination by trying to identify one or more time windows in which it would be possible, and in which it would make business sense, to make the requested delivery vehicle visit to the customer on the requested day. Thus, in a preferred embodiment of the invention, if the system identifies one or more time windows in which it would be possible, and in which it would make business sense, to make the requested delivery vehicle visit on the requested day, the answer to the question posed at Step 315 is "yes". If not, the answer is "no."

The system preferably performs Step 315 in the manner set forth in pending U.S. patent application Ser. No. 09/811,375, filed Mar. 16, 2001, and titled "Real Time Delivery Feasibility Analysis Systems and Methods", which is hereby incorporated herein by reference. In an alternative embodiment of the invention, the system performs this step using the "bucket method", which is well known in the art, and which also is described in pending U.S. patent application Ser. No. 09/811,375.

If the system determines, at Step 315, that no time windows are available for the requested day, the system proceeds to Step 320 where it determines whether the user wants to try to schedule the requested delivery vehicle visit for a day other than the requested day. If so, the system returns to Step 310 where it again prompts the user to specify a requested day for the delivery vehicle visit. If not, the system proceeds to Step 330, where it ends execution of the primary scheduling module 300.

If the system determines, at Step 315, that one or more time windows are available for the requested day, the system proceeds to Step 340 where it displays the time windows identified in Step 315 on the user's display screen. Thus, at Step 340, the system displays at least one time window in which the delivery service would be willing to make a delivery vehicle visit to the customer on the requested day. In a preferred embodiment of the invention, the system displays the identified time windows in a scheduling window 600 such as the scheduling window shown in FIG. 6A. As may be understood from this figure, such a window includes the requested date for the delivery vehicle visit 602 and one or more select buttons 605–630 that correspond to the windows in which the delivery service would be willing to make the delivery vehicle visit.

After executing Step 340, the system proceeds to Step 345 where it allows a user to request that a first delivery vehicle visit be made to the customer within a selected one of the displayed time windows. In the preferred embodiment of the invention, the system executes step 345 by displaying a scheduling window 600 such as the scheduling window 600 shown in FIG. 6A. A user may use this scheduling window 600 to select a particular one of the displayed time windows by using a mouse to select a button 605–630 that corresponds to the particular time window. For example, to select the 9:00 am–10:00 am time window, the user would use a mouse to select the "9:00 am–10:00 am" button 605 displayed in the scheduling window 600.

After the user selects one of the displayed time windows 605–630, the system proceeds to Step 350. In this step, the system determines whether the user wishes to schedule a periodic series of delivery vehicle visits that includes the first delivery vehicle visit and one or more additional delivery vehicle visits. Preferably, each delivery vehicle visit within the series is to be made on a different day, but within the selected time window.

Figure 6A:
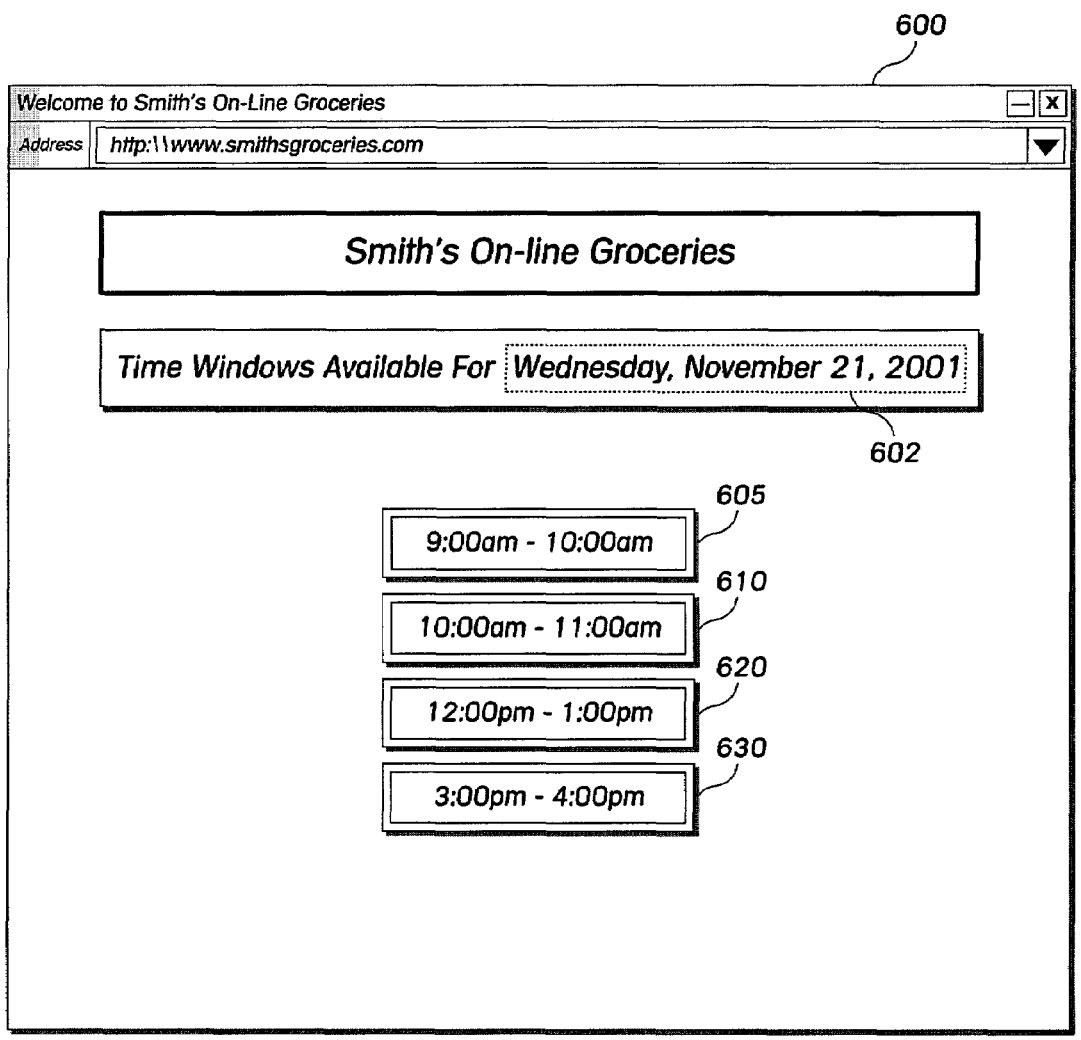
Figure 6B:
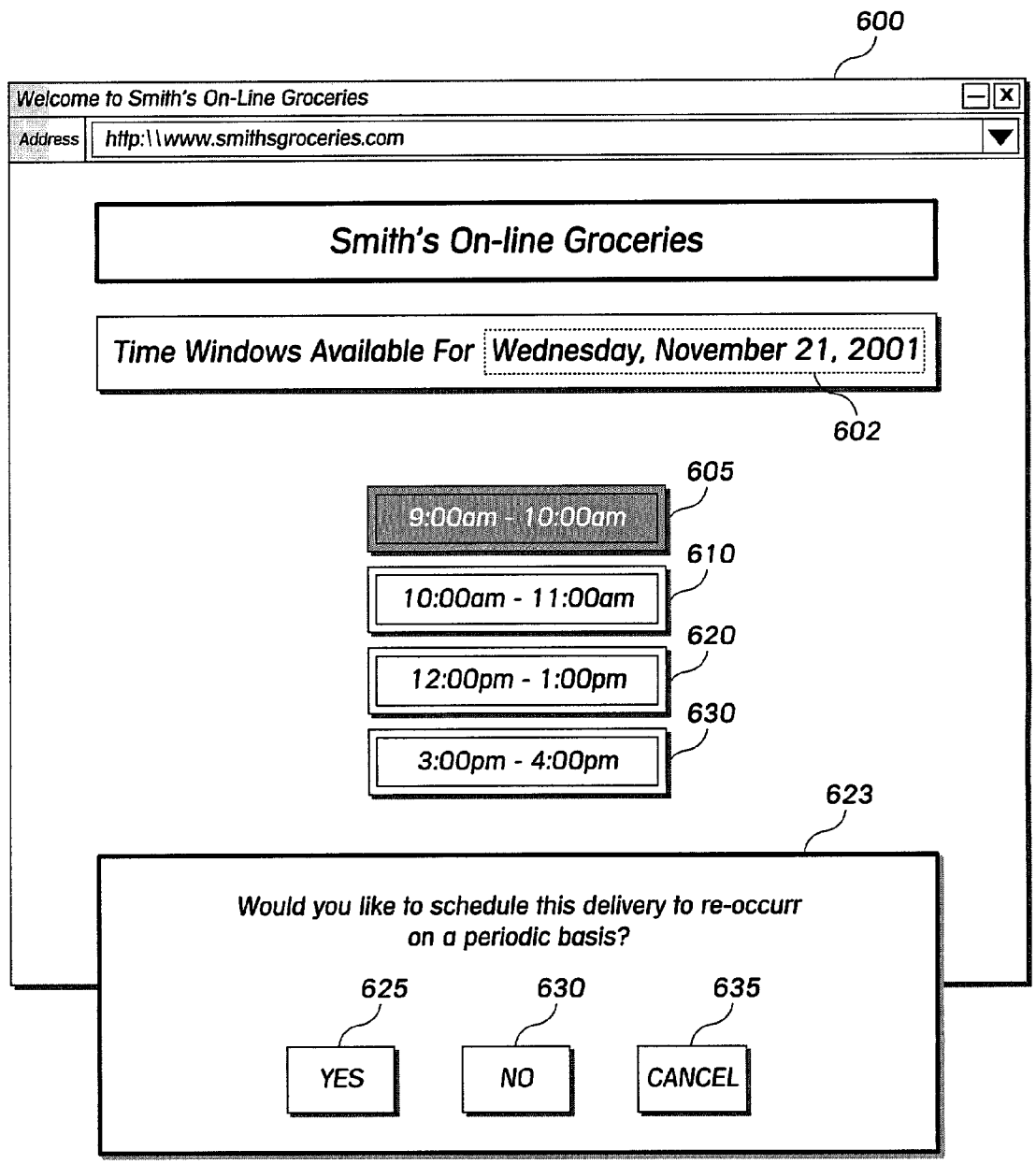
Figure 6C:
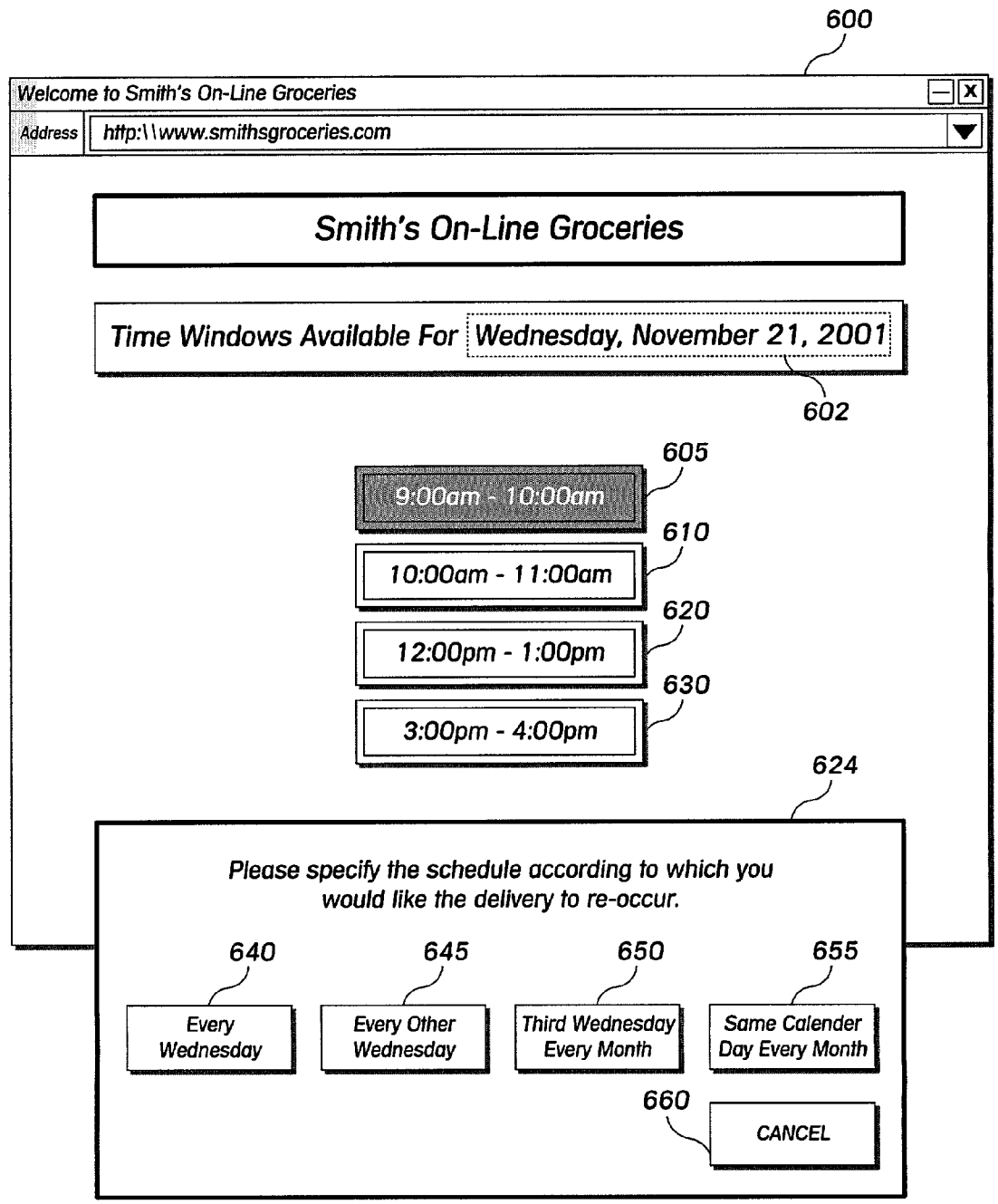

FIG. 6B depicts a preferred embodiment of the invention executing Step 350. As may be understood from this figure, a user has requested that a first delivery vehicle visit be made to a customer within a 9:00 am–10:00 am time window on Wednesday, Nov. 21, 2001. In response to this selection, the system has displayed a reoccurring delivery vehicle visit question window 623 that includes text asking whether the user wishes to schedule the delivery vehicle visit (in this case, a delivery) to reoccur on a periodic basis. The reoccurring delivery vehicle visit question window 623 includes a "Yes" button 625, a "No" button 630, and a "Cancel" button 635 for allowing a user to indicate their answer. The user may select the "Yes" button 625 if they wish to schedule the delivery vehicle visit to reoccur on a periodic basis. Similarly, the user may select the "No" button 630 if they do not wish to schedule the delivery vehicle visit to reoccur on a periodic basis. The user may select the "Cancel" button 635 if they wish to return to the scheduling window to select another time window for the delivery vehicle visit.

If the user specifies, at Step 350 that the delivery vehicle visit should not be scheduled to reoccur, the system proceeds to Step 385, where it firmly schedules the first requested delivery vehicle visit. The system then advances to Step 390 where it completes execution of the primary scheduling module 300.

If the user specifies, in Step 350 that the delivery vehicle visit should be scheduled to reoccur, the system proceeds to Step 360, where it allows the user to specify a schedule for the requested series of delivery vehicle visits. For example, in a preferred embodiment of the invention shown in FIG. 6C, the system displays a reoccurring delivery vehicle visit scheduling window 624 that allows a user to indicate how often they wish for the delivery vehicle visit to reoccur. This reoccurring delivery vehicle visit scheduling window 624 includes a button 640 that allows the user to specify that the delivery vehicle visit should occur on the same day every week (e.g., every Wednesday) within the currently selected time window (9:00 am–10:00 am). Similarly, the reoccurring delivery vehicle visit scheduling window 624 includes other buttons 645, 650, 655 that allow the user to specify, respectively, that the delivery vehicle visit should occur within the selected time window every other week (e.g., every other Wednesday), once every month on the same day during the same week of every month (e.g., on the third Wednesday of every month), or once every month on the same calendar day every month (e.g. on the $21^{st}$ day of every month). It should be understood that the system may alternatively be configured to allow the user to schedule the deliveries to re-occur according to any schedule, and preferably, according to any periodic schedule.

In a preferred embodiment of the system, the user is allowed to optionally schedule a finite number of periodically occurring delivery vehicle visits. For example, the user may be allowed to specify that the system should make a particular delivery vehicle visit according to a specified schedule for a certain number of weeks, or until a certain number of delivery vehicle visits have been completed.

After the user specifies a schedule for the requested delivery vehicle visits at Step 360, the system advances to Step 365, where it determines, based on a first set of scheduling information, whether to tentatively schedule each of the additional requested delivery vehicle visits according to the specified schedule. In a preferred embodiment of the invention, this first set of scheduling information includes information regarding previously scheduled series of reoccurring deliveries. In an alternative embodiment of the invention, this first set of scheduling information also includes information regarding previously scheduled one-time deliveries, and information regarding the days on which the delivery service will not perform delivery vehicle visits.

More particularly, in a preferred embodiment of the invention, the system determines at Step 365 whether it would be possible, and whether it would make business sense, to make each of the additional delivery vehicle visits according to the specified schedule. For example, a user may request, at Steps 345 and 360, that a first delivery be made between 9:00 am and 10:00 am on Thursday, Aug. 9, 2001, and that the delivery be made on a weekly basis until three deliveries have been completed. In this example, at Step 365, the system would first determine whether it would be possible, and whether it would make business sense, to repeat the first delivery on Thursday, Aug. 16, 2001 between 9:00 am and 10:00 am. The system would also determine, at Step 365, whether it would be possible, and whether it would make business sense, to repeat the first delivery again on Thursday, Aug. 23, 2001 between 9:00 am and 10:00 am. As noted above, the system would have already confirmed at Step 315, that the first delivery could be made as requested on Thursday, Aug. 9, 2001.

In a preferred embodiment of the invention, the system uses the techniques set forth in pending U.S. patent application Ser. No. 09/811,375 (referenced above) to determine whether it would be possible, and whether it would make business sense, to make a requested delivery vehicle visit within a particular time window on a particular day. As described in detail in pending patent application Ser. No. 09/811,375, in making this determination, the system considers: (1) whether the particular time window has been closed (which may occur, for example, if the time window falls on a holiday or on another day on which the delivery service will not make delivery vehicle visits); (2) whether the system has the capacity to make the delivery vehicle visit, and all other previously scheduled delivery vehicle visits, within the particular time window; and (3) whether the cost of making the requested delivery vehicle visit and all previously scheduled delivery vehicle visits would exceed a predefined threshold cost.

As an aside, Applicants note that pending patent application Ser. No. 09/811,375 does not describe determining whether it would be possible, and whether it would make business sense, to make a requested delivery vehicle visit within a particular time window on a particular day based on previously scheduled pickups. However, the techniques described in regard to making this determination based on previously scheduled deliveries may also be applied to making this determination based on previously scheduled pickups.

As described in the pending patent application Ser. No. 09/811,375 referenced above, the system preferably uses a standard routing and scheduling program, such as Roadnet 5000 to determine the cost of making requested delivery vehicle visits. This routing and scheduling program is preferably executed on a separate router client computer 55.

In a preferred embodiment of the invention, the system maintains a tentative scheduling database that includes scheduling information for series of orders that have been tentatively scheduled to occur according to various reoccurring schedules. This tentative scheduling database preferably also includes the dates and times (such as holidays) during which the delivery service will not make delivery vehicle visits. The system accesses the information within the tentative scheduling database in a manner known in the art and considers this information in Step 365 when determining whether it would be possible, and whether it would make business sense, to make a particular requested delivery vehicle visit. Preferably, the tentative scheduling database also includes information regarding tentatively and firmly scheduled one-time orders.

In a preferred embodiment of the invention, if the system determines, at Step 365, that the system should not tentatively schedule each of the additional requested delivery vehicle visits, the system informs the user at Step 375 that the delivery service is unable to schedule the entire requested series of delivery vehicle visits. The system then proceeds to Step 380 where it prompts the user to specify whether they would like to schedule the first delivery vehicle visit as a one-time (non-reoccurring) delivery vehicle visit. If so, the system schedules the first requested delivery vehicle visit at Step 385 and preferably displays a confirmation to the user (such as the confirmation shown on the confirmation screen 700 shown in FIG. 7A) that indicates the date and time that the delivery vehicle visit will be made. In a preferred embodiment of the invention, the system firmly schedules the first requested delivery vehicle visit at Step 385. The system then completes execution of the primary scheduling module at Step 390.

If the user specifies, at Step 380, that they would not like to schedule the first delivery vehicle visit as a one-time (non-reoccurring) delivery vehicle visit, the system proceeds directly to Step 390 where it completes execution of the primary scheduling module 300 without scheduling any delivery vehicle visits.

Returning to Step 365, if the system determines, based on the first set of scheduling information, that the system should tentatively schedule each of the additional requested delivery vehicle visits, the system informs the user that that the delivery service is able to tentatively schedule the requested series of deliveries. The system may do this, for example, by displaying a confirmation screen 700, such as the confirmation screen 700 shown in FIG. 7B. This confirmation screen 700 preferably indicates the schedule according to which the deliveries will be made.

Next, the system tentatively schedules each of the additional requested delivery vehicle visits at Step 370 by adding the additional requested delivery vehicle visits to the tentative scheduling database. The system then proceeds to Step 390 where it completes execution of the primary scheduling module 300.

In an alternative embodiment of the invention, if the system determines at Step 365 to tentatively schedule most, but not all, of the requested delivery vehicle visits within a requested series, the system identifies alternative delivery dates and/or time windows for any requested delivery vehicle visits that the system has determined not to tentatively schedule, and presents the user with a list of these alternative delivery dates and/or time windows for these unscheduled delivery vehicle visits. The system then prompts the user to choose an alternative delivery date and/or time for each of the unscheduled delivery vehicle visits. The system then proceeds to Steps 370 and 390, where it tentatively schedules each of the additional requested delivery vehicle visits and completes execution of the primary scheduling module 300.

In a preferred embodiment of the invention, the system regularly executes a scheduling job that, in turn, executes a secondary scheduling module 400. As is discussed in greater detail below, this secondary scheduling module 400 is used to determine whether the system should firmly schedule upcoming tentatively-scheduled delivery vehicle visits. If so, the secondary scheduling module firmly schedules the delivery vehicle visits by adding the delivery vehicle visits to a routing schedule for an upcoming period of time.

More specifically, in a preferred embodiment of the invention, the system executes the scheduling job (and, thus, the secondary scheduling module 400) on a daily basis to determine whether to firmly schedule any delivery vehicle visits that are tentatively scheduled to occur during a particular upcoming time period. For example, in a preferred embodiment of the invention, the system executes the scheduling job on a daily basis to determine whether to firmly schedule any delivery vehicle visits that are tentatively scheduled to occur on a day that is one week from the day on which the system executes the scheduling job. For example, if the scheduling job is executed on a particular Monday, the scheduling job determines whether to firmly schedule any delivery vehicle visits that are tentatively scheduled to occur on the following Monday.

The secondary scheduling module 400 begins at Step 405 where it advances to process the first tentatively scheduled delivery vehicle visit by preferably reading the first record within the tentative scheduling database. (In a preferred embodiment of the invention, each record in the tentative scheduling database corresponds to a delivery vehicle visit.) The system then advances to Step 410 where it determines whether the delivery vehicle visit is scheduled to occur in the upcoming time period (e.g., on the same weekday on which the scheduling job is executed, but in the following week). If not, the system advances to Step 440, which is discussed in greater detail below. If so, the system advances to Step 415 where the system determines whether to firmly schedule the delivery vehicle visit based on a second set of scheduling information. In a preferred embodiment of the invention, this second set of scheduling information includes information regarding previously scheduled one-time and reoccurring delivery vehicle visits, as well as dates (such as holidays and weekends) on which the delivery service will not make delivery vehicle visits.

More specifically, in a preferred embodiment of the invention, the system determines at Step 415 whether it would be possible, and whether it would make business sense, to firmly schedule the delivery vehicle visit. In a preferred embodiment of the invention, the system makes this determination in the manner set forth in pending U.S. patent application Ser. No. 09/811,375, filed Mar. 16, 2001, and titled "Real Time Delivery Feasibility Analysis Systems and Methods", which (as noted above) is hereby incorporated herein by reference. In an alternative embodiment of the invention, the system performs this process using the "bucket method", which is well known in the art, and which is also described in pending U.S. patent application Ser. No. 09/811,375.

In a preferred embodiment of the invention, the system may take economic considerations into account when determining, at Step 415, whether to firmly schedule the particular delivery vehicle visit. For example, as described in greater detail in pending U.S. patent application Ser. No. 09/811,375, the system may first calculate the cost associated with making the delivery vehicle visit and compare this cost with a predetermined threshold cost. If the cost associated with making the delivery vehicle visit is greater than the threshold cost, the system will determine not to firmly schedule the delivery vehicle visit. Otherwise, the system will not preclude the delivery vehicle visit from being firmly scheduled based upon cost.

If, at Step 415, the system determines not to firmly schedule the delivery vehicle visit, the system proceeds to Step 430, where it advises the user that the delivery vehicle visit can not be made as scheduled. Preferably, the system further advises the user that the delivery vehicle visit must be rescheduled.

The system may advise the user that the delivery vehicle visit can not be made as scheduled by, for example, informing a customer service representative to contact the user. Alternatively, the system may contact the user directly. For example, the system may transmit to the user an electronic mail message, a page, a voice mail message, an instant message, or any other electronically-based communication indicating that the delivery vehicle visit can not be made as scheduled. Alternatively, the system can generate and send the user a paper letter or other non-electronic communication to this effect via standard mail.

Next, the system proceeds to Step 435 where it allows the user to reschedule the delivery vehicle visit. For example, in a preferred embodiment of the invention, at Step 430, the system sends the user an e-mail message informing the user that the delivery vehicle visit must be rescheduled. This e-mail preferably includes a link to a web page on which the user may reschedule the delivery vehicle visit by selecting from one or more available alternative dates and/or times for the delivery vehicle visit. Alternatively, in Step 430, the system may transmit a phone number to the user that the user may call to reschedule the delivery vehicle visit either electronically or with the assistance of an customer service representative. Similarly, in Step 430, the system may transmit an e-mail message and a list of available rescheduling options to the user and the user may reschedule the delivery vehicle visit by sending a selected rescheduling option to the provided e-mail address.

After completing Step 435, the system proceeds to Step 440, where the system determines whether all tentatively scheduled vehicle delivery vehicle visits have been processed. If so, the system completes execution of the secondary scheduling module at Step 445. If not, the system proceeds to Step 442 where it advances to process the next tentatively scheduled delivery vehicle visit for the upcoming time period. The system then begins processing the next tentatively scheduled delivery vehicle visit at Step 410.

While the core aspects of this embodiment of the invention are described in detail above, several additional aspects of the inventive system are worth noting. For example, the system may be configured to allow a user to use a single request to automatically schedule a series of reoccurring deliveries in which the contents of two or more of the deliveries are at least substantially the same. This aspect of the invention is especially useful when scheduling reoccurring deliveries of staple items, such as certain types of groceries that a consumer may need to purchase on a regular basis.

First Alternative Embodiment of the Scheduling Module

A first alternative embodiment of the scheduling module 500 is shown in FIGS. 5A–5C. When executing this the scheduling module, the system first receives, at Step 505, a request from a user to schedule a first delivery vehicle visit. The system then advances to Step 510 where it prompts the user to specify a requested day for the first delivery vehicle visit. The system then determines, at Step 515, whether any time windows are available for the requested day. Stated differently, at Step 515, the system determines whether the delivery service would be willing to make a delivery vehicle visit to the customer within any time window on the request day. In a preferred embodiment of the invention, the system makes this determination by tying to identify one or more time windows, in wich it would be possible, and in wich it would make business sense, to make the requested delivery vehicle visit to the customer on the requested day. Thus, in a preferred embodiment of the invention, if the system identifies one or more time windows in wich it would be possible, and in wich it would make business sense, to make the requested delivery vehicle visit on the requested day, the answer to the question posed at Step 515 is "yes". If not, the answer is "no."

The system preferably performs Step 515 in the manner set forth in pending U.S. patent application Ser. No. 09/811,375, filed Mar. 16, 2001, and titled "Real Time Delivery Feasibility Analysis Systems and Methods", which, as noted above, are incorporated herein by reference. In an alternative embodiment of the invention, the system performs this step using the "bucket method", which is well known in the art, and which also is described in pending U.S. patent application Ser. No. 09/811,375.

If the system determines, at Step 515, that no time windows are available for the requested day, the system proceeds to Step 520 where it determines whether the user wants to try to schedule the requested delivery vehicle visit for a day other than the requested day. If so, the system returns to Step 510 where it again prompts the user to specify a requested day (which may be referred to as the "first requested day") for the delivery vehicle visit. If not, the system proceeds to Step 530, where it ends execution of the primary scheduling module 500.

If the system determines, at Step 515, that one or more time windows are available for the requested day, the system proceeds to Step 540 where it displays the time windows identified in Step 515 on the user's display screen. Thus, at Step 540, the system displays at least one time window in which the delivery service would be willing to make a delivery vehicle visit to the customer on the requested day. In a preferred embodiment of the invention, the system displays the identified time windows in a scheduling window 600 such as the scheduling window shown in FIG. 6A. As may be understood from this figure, such a scheduling window 600 includes the requested date for the delivery vehicle visit 602 and one or more selection buttons 605–630 that correspond to the time windows in which the delivery service would be willing to make the delivery vehicle visit.

After executing Step 540, the system proceeds to Step 545 where it allows a user to request that the first delivery vehicle visit be made to the customer within a selected one of the displayed time windows. In the preferred embodiment of the invention, the system executes step 545 by displaying the scheduling window 600 described above. A user may use this window 600 to select a particular displayed time window by using a mouse to select a scheduling button 605–630 that corresponds to the particular time window.

After the user selects one of the displayed time windows 605–630, the system proceeds to Step 550. In this step, the system determines whether the user wishes to schedule a second delivery vehicle visit to be made on a second day, but within the time window selected for the first delivery vehicle visit.

Figure 6D:
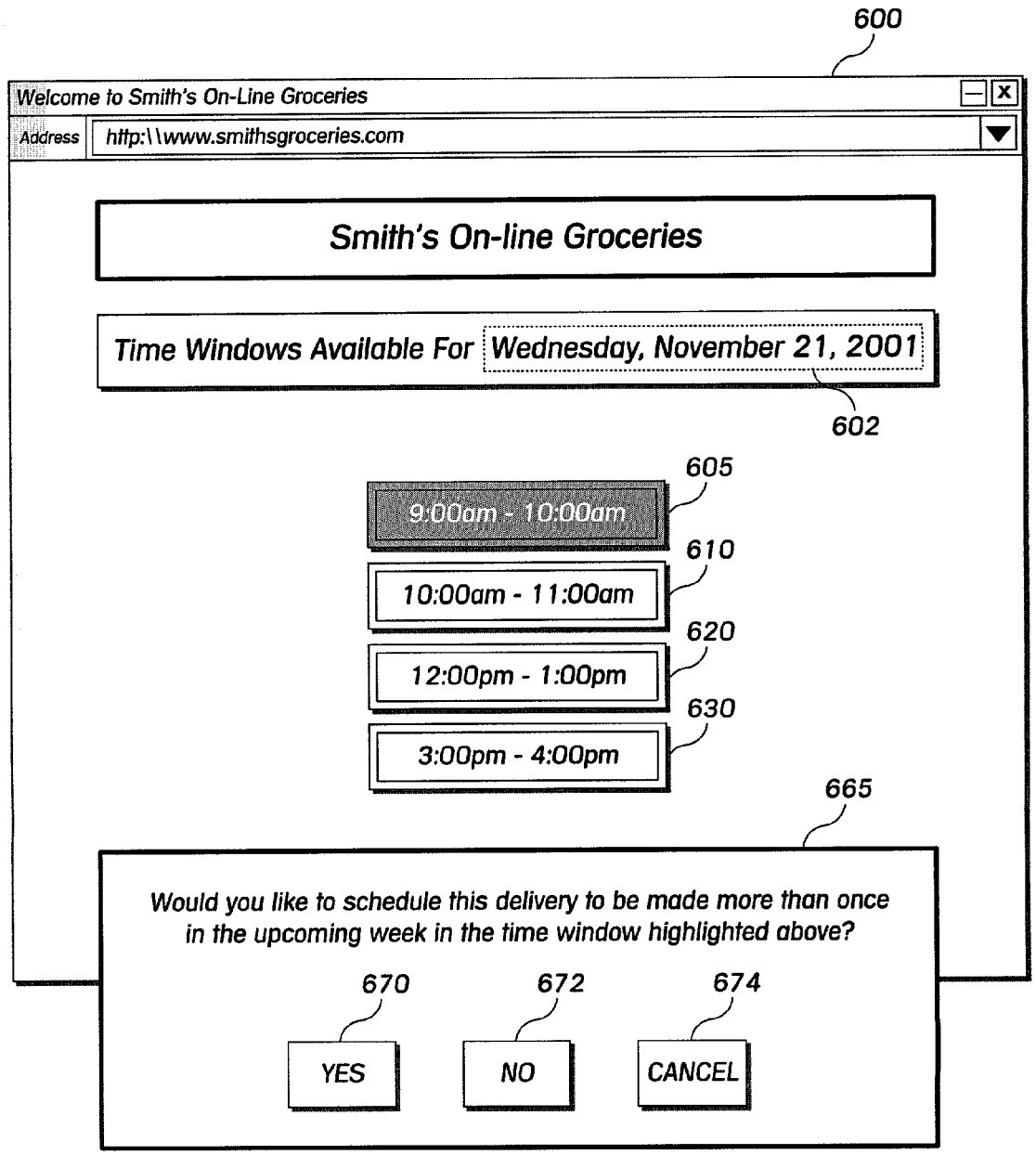
Figure 6E:
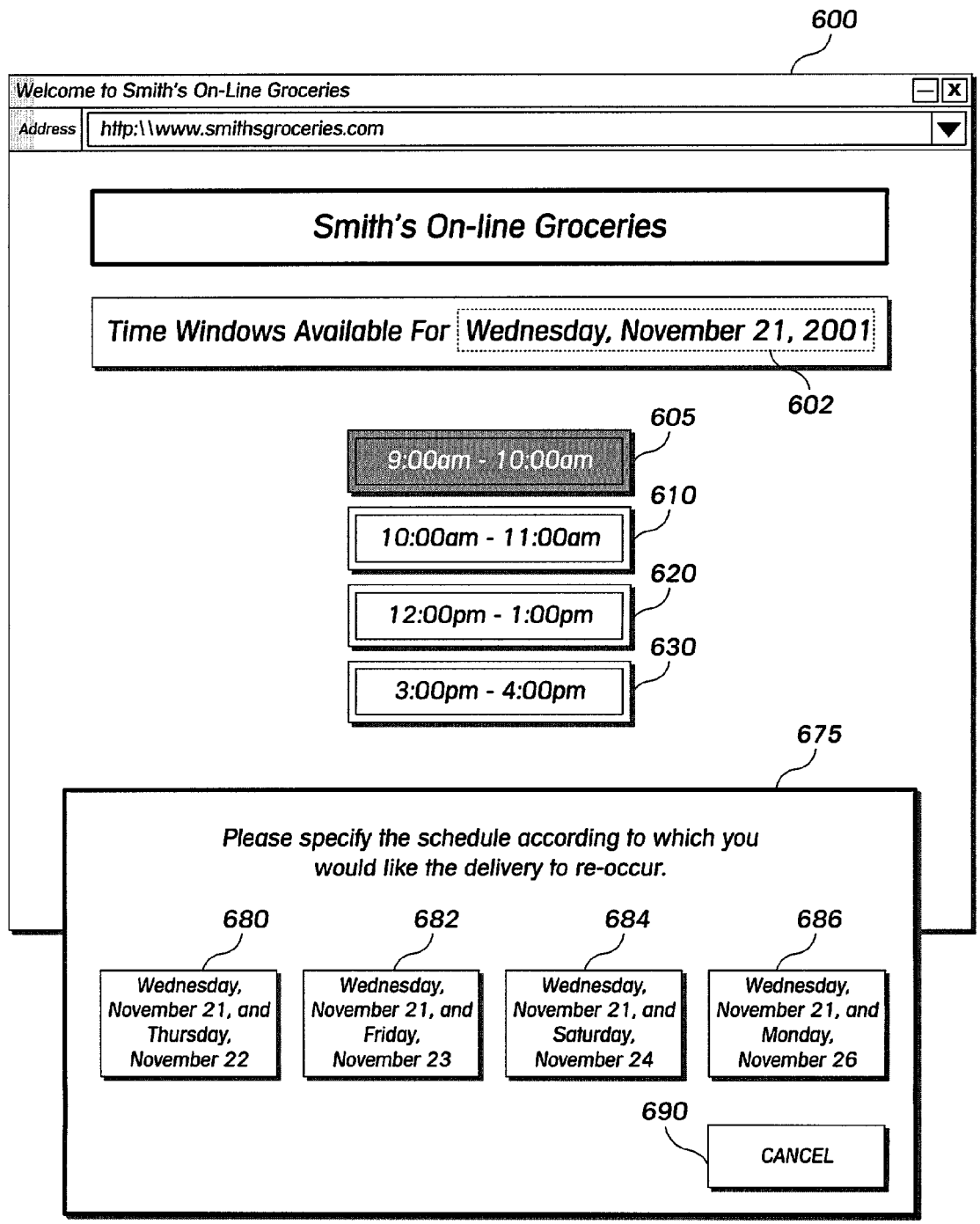

FIG. 6D depicts a preferred embodiment of the invention executing Step 550. As may be understood from this figure, a user has requested that a first delivery vehicle visit be made to a customer within a 9:00 am–10:00 am time window on Wednesday, Nov. 21, 2001. In response to this selection, the system has displayed a reoccurring delivery vehicle visit question window 665 that includes text asking whether the user wishes to schedule a second delivery vehicle visit to be made on a second day, but within the selected time window. More specifically, in this example, the delivery vehicle visit question window 665 displays text asking the user whether the user wants to schedule the delivery vehicle visit to be made more than once in the upcoming week, but within the same time window.

As shown in FIG. 6D, the reoccurring delivery vehicle visit question window 665 preferably includes a "Yes" button 670, a "No" button 672, and a "Cancel" button 674 for allowing a user to indicate their answer. The user may select the "Yes" button 670 if they want to schedule the delivery vehicle visit to be made more than once in the upcoming week. Similarly, the other user may select the "No" button 672 if they do not wish to schedule the delivery vehicle visit to be made more than once in the upcoming week. The user may select the "Cancel" button 674 if they wish to return to the scheduling window 600 to select another time window for the delivery vehicle visit.

If the user specifies, at Step 550 that they do not wish to schedule the delivery vehicle visit to be made more than once in the upcoming week, the system proceeds to Step 585, where it firmly schedules the first requested delivery vehicle visit. The system then advances to Step 590 where it completes execution of the scheduling module 500.

If the user specifies, at Step 550 that the delivery vehicle visit should be scheduled to reoccur, the system proceeds to Step 560, where it allows the user to specify a particular day (which may be referred to as "the second requested day") on which the second delivery vehicle visit should occur. In a preferred embodiment of the invention, the system does this by displaying a dialog box, such as the dialog box 675 shown in FIG. 6E, and uses this dialog box to determine the days on which the user would like the first and second delivery vehicle visits to occur.

This dialog box 675 preferably includes one or more scheduling buttons 680–686 that are configured to allow the user to indicate on which two days within the upcoming week the delivery vehicle visit should be made. For example, in the example shown in FIG. 6E, scheduling button 680 provides the user with the option of requesting that a delivery be made within the 9:00 am–10:00 am time window on both Wednesday, November 21 and Thursday, November 22. Similarly, scheduling button 682 provides the user with the option of scheduling the delivery to be made within the 9:00 am–10:00 am time window on both Wednesday, November 21, and Friday, November 23. In this example, scheduling Buttons 684 and 686 also provide the user with other unique options of scheduling the delivery to be made within the 9:00 am–10:00 am time window within two different days within the upcoming week.

It should be understood that, in this embodiment of the invention, the user issues a single request by selecting one of the scheduling buttons 680–686 displayed within dialog box 675. More particularly, by selecting one of the scheduling buttons 680–686, the user defines a series of delivery vehicle visits comprising two delivery vehicle visits (in this case, deliveries) and issues a request that the system schedule the two delivery vehicle visits. For example, by selecting the modified version of scheduling button 680 described above, the user issues a request that a particular delivery be made within the 9:00 am–10:00 am time window on both Wednesday, November 21 and Thursday, Nov. 22, 2001.

After the user specifies a schedule for the requested delivery vehicle visits at Step 560, the system advances to Step 565, where the system determines whether the second delivery vehicle visit should be scheduled within the requested particular time window on the second requested day. In a preferred embodiment of the invention, the system bases this determination on whether it would be possible, and whether it would make business sense, to schedule the delivery vehicle visit within the requested particular time window on the second requested day. In a preferred embodiment of the invention, the system makes this determination in the manner set forth in pending U.S. patent application Ser. No. 09/811,375, which, as noted above, is incorporated herein by reference.

If the system determines, at Step 565, that the second delivery vehicle visit should be scheduled within the requested particular time window on the second requested day, the system proceeds to Step 570 where it schedules the first and second delivery vehicle visits as requested. In a preferred embodiment of the invention, the system firmly schedules both the first and second delivery vehicle visits at Step 570. The system then proceeds to Step 590 where it completes execution of the scheduling module 500.

In a preferred embodiment of the invention, if the system determines, at Step 565, that the system should not schedule the second delivery vehicle visit on the particular day specified by the user, and within the particular time window, the system informs the user at Step 575 that the delivery service is unable to schedule the second delivery vehicle visit as requested. The system then proceeds to Step 580 where it prompts the user to specify whether they would like to schedule the first delivery vehicle visit as a one-time (non-reoccurring) delivery vehicle visit. If so, the system schedules the first requested delivery vehicle visit at Step 585 and preferably displays a confirmation to the user that indicates the date and time that the scheduled delivery vehicle visit will be made. In a preferred embodiment of the invention, the system firmly schedules the first requested delivery vehicle visit at Step 585. The system then completes execution of the primary scheduling module at Step 590.

If the user specifies, at Step 580, that they would not like to schedule the first delivery vehicle visit as a one-time (non-reoccurring) delivery vehicle visit, the system proceeds directly to Step 590 where it completes execution of the primary scheduling module 500 without scheduling any delivery vehicle visits.

While the core aspects of the this embodiment are described in detail above, several additional aspects of the system are worth noting. For example, the system is preferably configured to operate in real time. This is advantageous because it provides the user with instant feedback regarding the user's scheduling requests. Similarly, the system is preferably configured to display a confirmation message immediately after scheduling one or more requested delivery vehicle visits. More particularly, in one embodiment of the invention, the system is configured for displaying a confirmation message to a user confirming that the first and second delivery vehicle visits have been scheduled. The system displays this confirmation message in response to a combination of: (1) the user's single request; (2) a determination at Step 515 that the first delivery vehicle visit should be scheduled within the requested particular time window on the first day; and (3) a determination at Step 565 that the second delivery vehicle visit should be scheduled within the requested particular time window on the second day. Examples of such confirmation messages are discussed above in reference to FIGS. 7A and 7B.

Furthermore, in a preferred embodiment of the invention, the first and second delivery vehicle visits are deliveries, and the second delivery includes substantially all of the items included in the first delivery. In this embodiment of the invention, the user's single request comprises: (1) a definition of a first set of items to be included within the first delivery; (2) an indication that the first set of items should be delivered within a particular time window on a first day; and (3) an indication that the first set of items should be delivered, according to a reoccurring delivery schedule, within the same particular time window on at least one day other than the first day. It should be understood that, in one embodiment of the invention, the first and second delivery vehicle visits may both be pickups rather than deliveries. It should also be understood that this embodiment of the invention could be modified to use the techniques described above to allow a user to use a single request to schedule more than two deliveries.

In one preferred embodiment of the invention, the system is configured to only display, in window 675 (see FIG. 6E), pairs of days in which the delivery service can make the delivery vehicle visit within the time window on both days. Thus, before displaying a particular combination of days as an option to the user, the system determines, in the manner set forth above, that the delivery service is willing to make the delivery vehicle visit within the requested time window on both the first day and the second day. This results is a more efficient delivery scheduling process.

First Alternative Embodiment of Scheduling Screen

An alternative embodiment of a scheduling screen 800 according to the present invention is shown in FIGS. 8A and 8B. As may be understood from these figures, this alternative scheduling screen 800 allows users to quickly specify that a requested delivery vehicle visit should reoccur within a selected time window according to a particular schedule. To do this, the user first selects a particular time window 805–830 as discussed above. The user then selects a reoccurrence button 832 on the scheduling screen 800. As shown in FIG. 8B, this causes the system to display a drop-down box 831 of scheduling options 836–839. Next, the user then selects the desired scheduling option 836–839 from the drop-down box 831. Finally, the user issues a request that the specified series of delivery vehicle visits be made by selecting the continue button 835 on the scheduling screen 800. The system then schedules the requested series of delivery vehicle visits preferably using either the primary and secondary scheduling modules 300–400, or an alternative embodiment of the scheduling module 500, such as the first alternative embodiment of the scheduling module described above.

Second Alternative Embodiment of the Invention

Figure 9A:
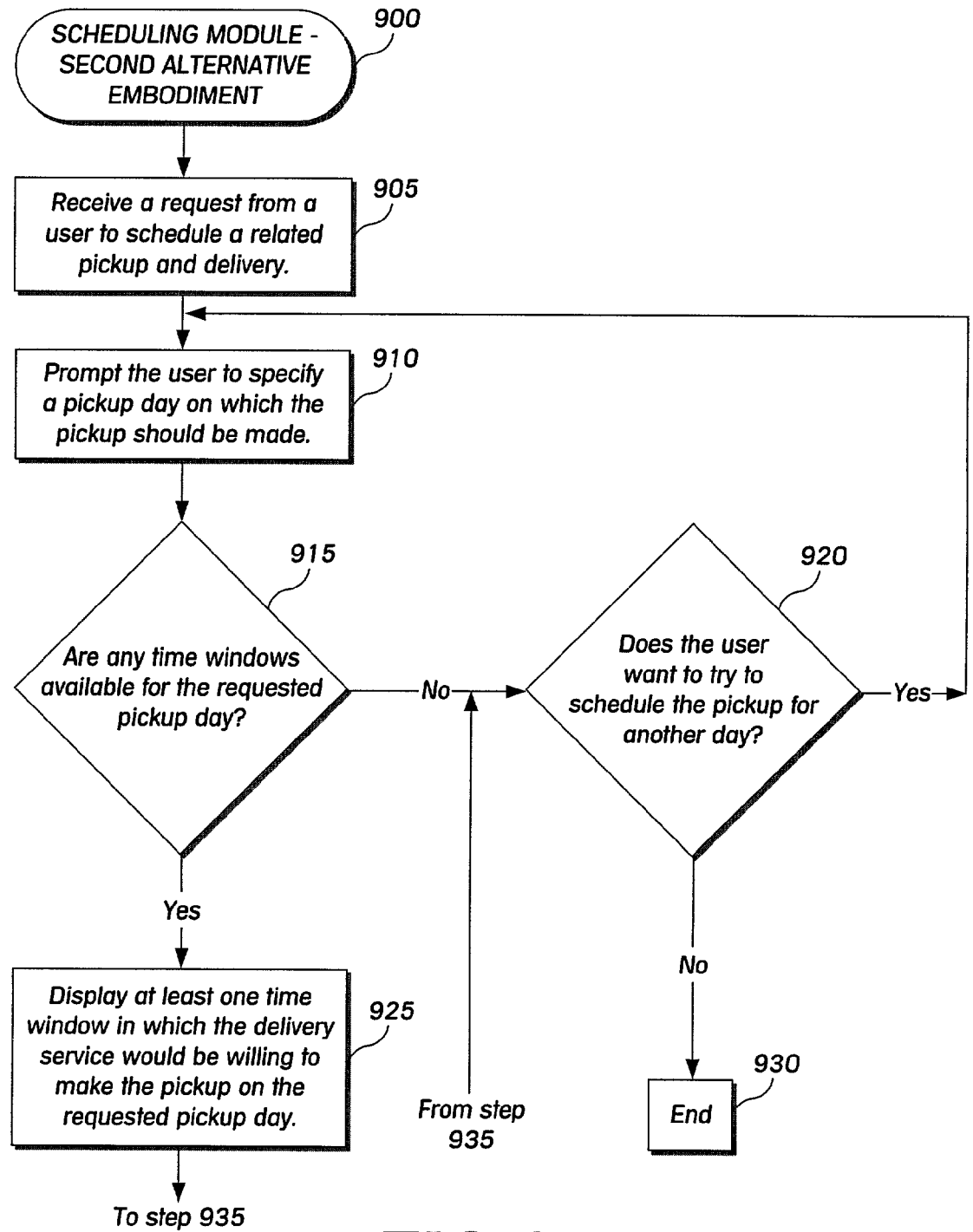
Figure 9B:
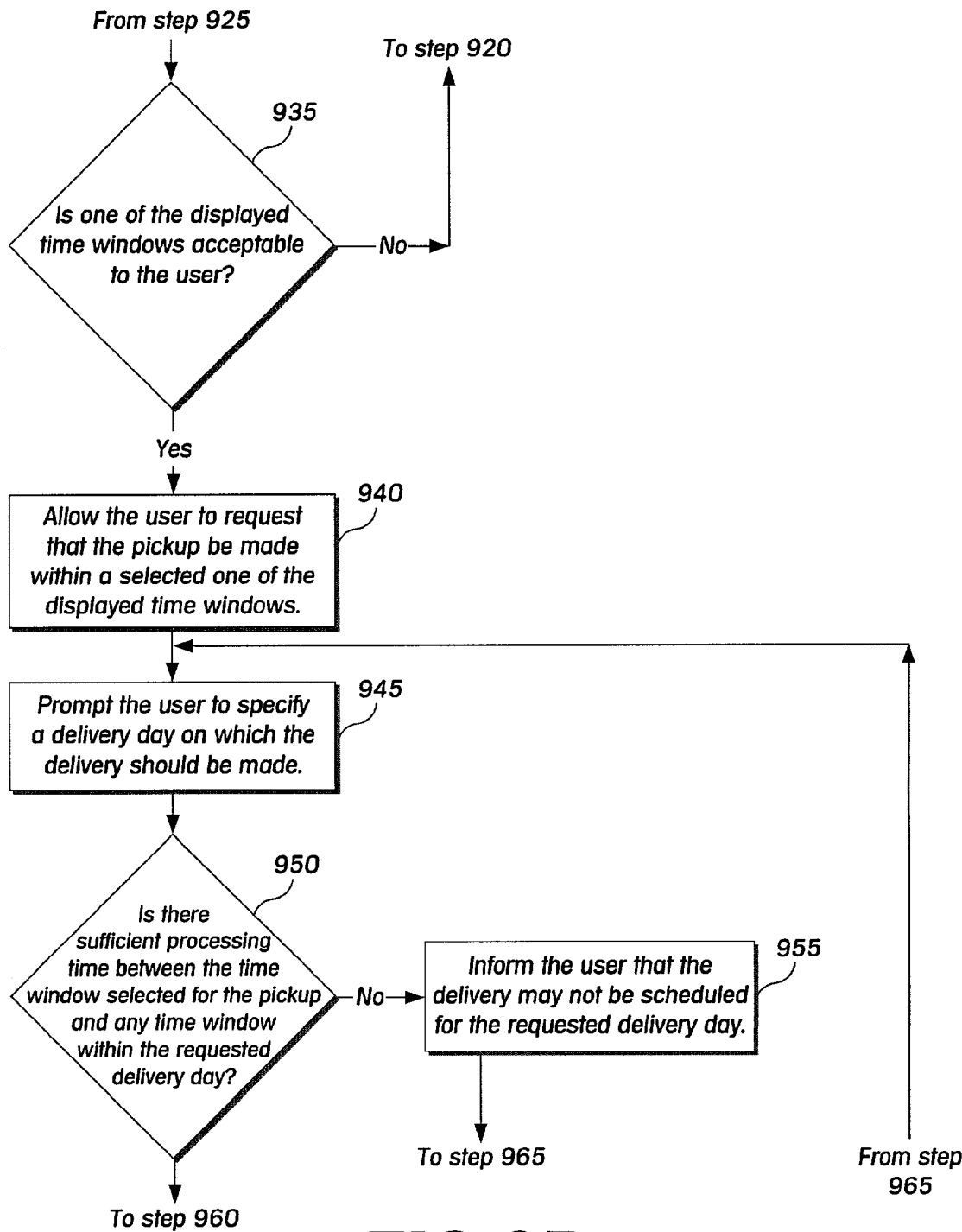
Figure 9C:
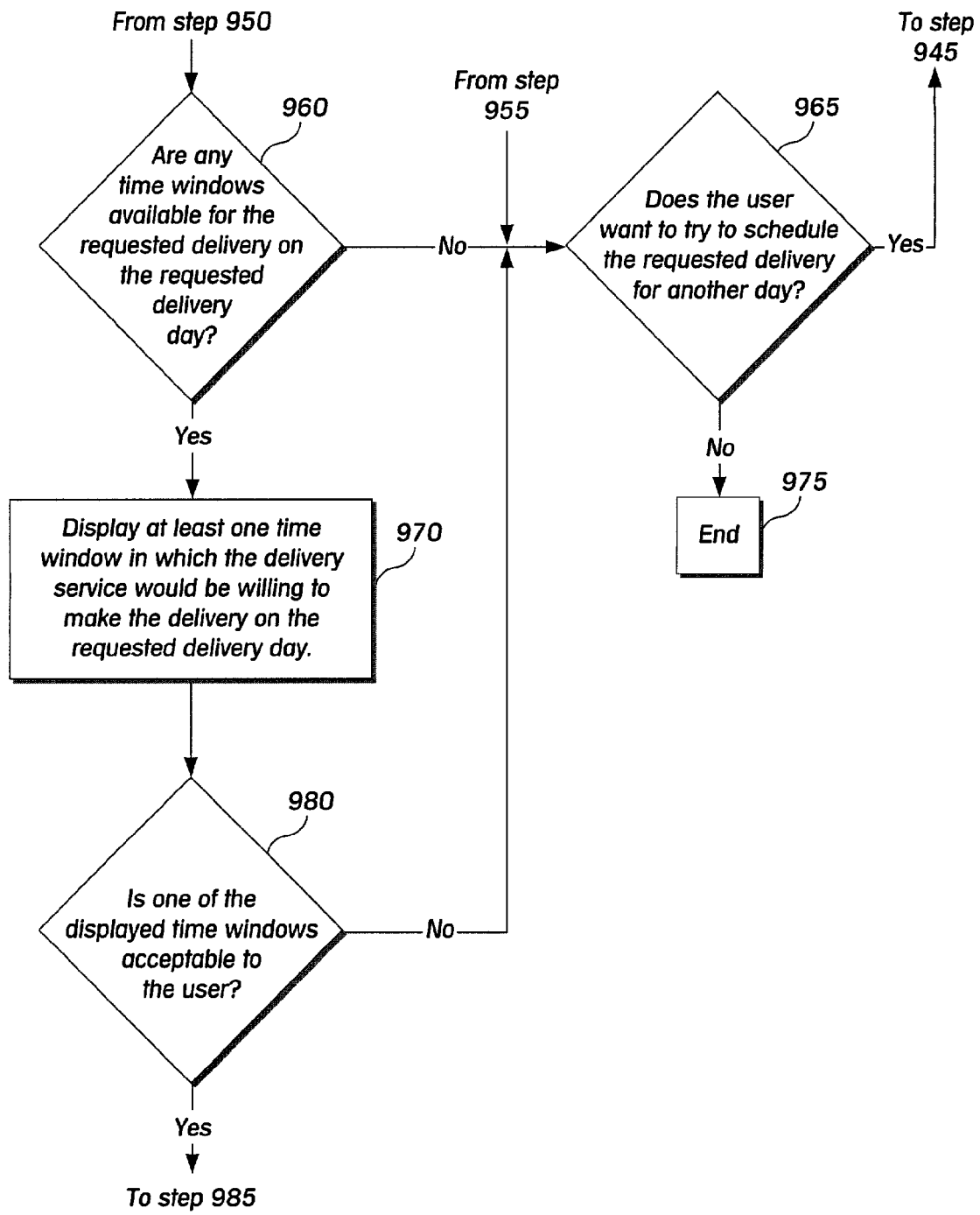
Figure 9D:
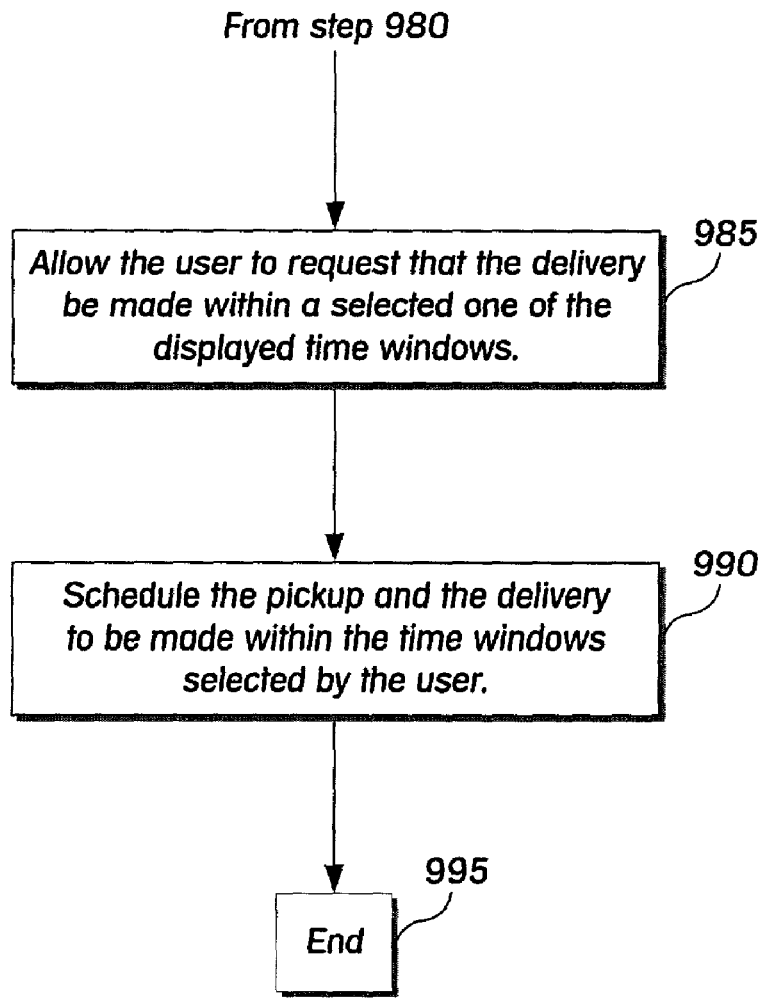

A second alternative embodiment of the scheduling module 900 is shown in FIGS. 9A–9C. As shown in these figures, when the scheduling module 900 is executed by the system, the system first receives, at Step 905, a request from a user to schedule both a pickup, and a delivery that is related to the pickup. For example, the system may receive a request from a user to schedule a time for a dry cleaning service to pick up laundry from the user's house, and to schedule a time for the dry cleaning service to deliver the user's laundry back to the user's house after the laundry has been dry cleaned. Here, the pickup and delivery are related because they involve transporting clothing as part of a single dry cleaning transaction.

In a preferred embodiment of the invention, the system allows a user to enter the request referenced in Step 905 using one or more display screens, such as the display screen 1000 shown in FIG. 10. This display screen is discussed in greater detail below.

After receiving a request from a user to schedule a related pickup and delivery at Step 905, the system proceeds to Step 910 where it prompts the user to specify a day on which the pickup should be made. This day may be referred to as a "pickup day". The system then advances to Step 915, where it determines whether any time windows are available for the requested pickup day. Stated differently, at Step 915, the system determines whether the delivery service would be willing to make the pickup within any time window on the requested day. In a preferred embodiment of the invention, the system makes this determination by trying to identify one or more time windows in which it would be possible, and in which it would make business sense, to make the requested pickup on the requested day. If the system identifies one or more time windows in which it would be possible, and in which it would make business sense, to make the requested pickup on the requested day, the answer to the question posed at Step 915 is "yes". If not, the answer is "no."

The system preferably performs Step 915 in the manner set forth in pending U.S. patent application Ser. No. 09/811, 375, filed Mar. 16, 2001, and titled "Real Time Delivery Feasibility Analysis Systems and Methods", which is hereby incorporated herein by reference. In an alternative embodiment of the invention, the system performs this process using the "bucket method", which is well known in the art, and which is also described in pending U.S. patent application Ser. No. 09/811,375.

If the system determines, at Step 915, that no time windows are available for the requested pickup day, the system proceeds to Step 920 where it determines whether the user wants to try to schedule the pickup for a day other than the requested day. If so, the system proceeds back to Step 910 where it again prompts the user to specify a requested day for the pickup. If the system determines, at Step 920, that the user does not want to schedule the pickup for another day, the system proceeds to Step 930, where it ends execution of the scheduling module 900.

Returning to Step 915, if the system determines, that one or more time windows are available for the requested day, the system proceeds to Step 925 where it displays the time windows identified in Step 915 on the user's display screen. Thus, at Step 925, the system displays at least one time window in which the delivery service would be willing to make the pickup on the requested pickup day. In a preferred embodiment of the invention, the system displays the identified time windows on a pickup time window scheduling screen such as the scheduling screen 1300 shown in FIG. 13. As may be understood from this figure, the the pickup time window scheduling screen 1300 preferably includes the requested date for the pickup and one more time windows 1305 in wich the delivery service would be willing to make the pickup.

After executing Step 925, the system proceeds to Step 935 where it determines whether one of the display time windows is acceptable to the user. The system preferably makes this determination by accepting an appropriate input from a user. In a preferred embodiment of the invention, the system allows a user to indicate that one of the displayed time windows is acceptable by selecting a button representing an acceptable time window (such as buttons 1305) and then selecting a continue button 1310. In this embodiment of the invention, the user may indicate that none of the windows are acceptable by selecting a cancel button 1315, and then clicking on a "cancel order" button 1405 on a transition screen 1400 that is displayed in response to the user clicking the cancel button 1315.

If the system determines, at Step 935, that none of the displayed time windows is acceptable to the user, the system returns to Step 920, and proceeds as described above. If the system determines, at Step 935, that one of the time windows is acceptable to the user, the system proceeds to Step 940, where it allows the user to request that the pickup be made within a selected one of the displayed time windows. In a preferred embodiment of the invention, the system allows the user to make this request by selecting a button (such as one of the buttons 1305 shown in FIG. 13) corresponding to one of the displayed time windows.

Next, the system proceeds to Step 945 where it prompts the user to specify a delivery day on which the requested delivery should be made. After the user inputs a requested delivery day, the system advances to Step 950, where it determines whether there is sufficient processing time between the time window selected for the pickup and any time window within the requested delivery day.

In one example, a user may request, in Steps 910 and 940, that a dry cleaning service pickup their dirty laundry within 9:00 am–10:00 am time window on Sep. 28, 2001. The user may further specify, at Step 945, that the laundry should be returned to the user on Sep. 30, 2001. In this example, at Step 950, the system would determine whether sufficient processing time exists between the 9:00 am–10:00 am time window on Sep. 28, 2001 and any time window on Sep. 30, 2001 to pickup, clean, and return the user's laundry. In one embodiment of the invention, the system does this by: (1) determining the number of minutes between the ending time of the time window specified for the pickup (in this example 10:00 am), and the beginning time of the last time window on the day requested for the delivery (this number of minutes may be referred to as the "lag time" between time window specified for the pickup and the day requested for the delivery); and (2) comparing this lag time with a threshold lag time associated with the requested pickup/delivery. In a preferred embodiment of the invention, the system may be programmed to associate different threshold lag times with different activities requested by the user. For example, in a dry cleaning context, the system may be programmed to use a first threshold lag time if the user has only requested that shirts be cleaned, and a second, longer, threshold lag time if the user has requested that one or more suits be dry cleaned. As will be understood by one skilled in the art, users can define threshold lag times that correspond to various tasks or requests, based upon any factors chosen by the user.

If the system determines, at Step 950, that there is not sufficient processing time between the time window selected for the pickup and any time window on the requested delivery day, the system advances to Step 955 where it informs the user that the delivery may not be scheduled for the requested delivery day. The system then proceeds to Step 965, where the system determines whether the user wants to try to schedule the requested delivery for another day. If not, the system completes execution of the scheduling module at Step 975. If so, the system returns to Step 945, where it prompts the user to specify another day on which the delivery should be made.

Returning to Step 950, if the system determines that there is sufficient processing time between the time window selected for the pickup and any time window within the requested delivery day, the system proceeds to Step 960, where it determines whether any time windows are available for the requested delivery on the requested delivery day. In a preferred embodiment of the invention, the system makes this determination is the same general manner as that described above in reference to Step 915. However, in determining whether it would be possible to make the delivery within a particular time window on the requested day, the system takes into account whether sufficient time exists between the particular time window and the time window requested for the pickup. In one embodiment of the invention, the system does this by: (1) determining the number of minutes between the ending time of the time window specified for the pickup (in this example 10:00 am), and the beginning time of the particular time window (this number of minutes may be referred to as the "lag time" between the time window specified for the pickup and the particular time window); and (2) comparing this lag time with a threshold lag time associated with the requested pickup/delivery. As noted above, in a preferred embodiment of the invention, the system may be programmed to associate different threshold lag times with different activities requested by the user.

If the system determines, at Step 960, that no time windows are available for the requested delivery day, the system proceeds to Step 965, where it determines whether the user wants to try to schedule the requested delivery for another day. If not, the system completes execution of the scheduling module at Step 975. If so, the system returns to Step 945, where it prompts the user to specify another day on which the delivery should be made.

If the system determines, at Step 960, that one or more time windows are available for the requested day, the system proceeds to Step 970 where it displays the time windows identified in Step 960 on the user's display screen. Thus, at Step 970, the system displays at least one time window in which the delivery service would be willing to make the delivery on the requested day. In a preferred embodiment of the invention, the system displays the identified time windows in a scheduling window such as the scheduling window 1600 shown in FIG. 16. As may be understood from this figure, such a scheduling window 1600 includes the requested date for the delivery 1603 and one or more buttons 1605–1615 that correspond to time windows in which the delivery service would be willing to make the delivery.

After executing Step 970, the system proceeds to Step 980 where it determines whether one of the displayed time windows is acceptable to the user. The system preferably makes this determination by accepting an appropriate input from a user. In a preferred embodiment of the invention, the system allows a user to indicate that one of the displayed time windows is acceptable by selecting a button representing an acceptable time window (such as buttons 1605–1615, shown in FIG. 16) and then selecting a continue button 1620. In this embodiment of the invention, the user may indicate that none of the windows are acceptable by selecting a cancel button 1625, and then clicking on a "cancel order" button 1705 on a transition screen 1700 that is displayed in response to the user clicking the "cancel order" button 1705.

If the system determines, at Step 980, that none of the displayed time windows is acceptable to the user, the system advances to Step 965, and proceeds as described above. If the system determines, at Step 980, that one of the time windows is acceptable to the user, the system proceeds to Step 985, where it allows the user to request that the delivery be made within a selected one of the displayed time windows.

Next, the system advances to Step 990, where it schedules the pickup and the delivery as indicated by the user in steps 940 and 985. The system then ends execution of the scheduling module 900 at Step 995.

An example of a scheduling system that functions according to a preferred embodiment of the scheduling module 900 described above is depicted in FIGS. 10–17. This system is used for scheduling pickups and deliveries the context of a dry cleaning business.

To use the system, a user may log on to a dry cleaning service's home page, such as the home page 1000 shown in FIG. 10. This home page 1000 preferably allows the user to select various service-related and informational options using one or more selection buttons 1005–1015. For example, in a preferred embodiment of the invention, the user may choose to schedule a pickup and a related delivery by selecting a "Schedule a Pickup and Delivery" button 1015. This takes the user to an order entry screen, such as screen 1100 shown in FIG. 11, on which the user may specify the number and type of articles to be cleaned by completing entry fields 1105. In one embodiment of the invention, if necessary, the user may select the "More Selections" button 1110 to display additional menus of items to be cleaned. After the user has entered all of the articles to be cleaned, the user selects a "Continue" button 1115 to continue scheduling the order. Alternatively, the user may cancel the order by selecting a "Cancel" button 1120.

After the user has entered the items to be picked up for cleaning, and has selected the "Continue" button 1115, the system displays a pickup date scheduling screen 1200. This scheduling screen 1200 allows the user to specify a date on which they would like the entered items to be picked up for cleaning. In a preferred embodiment of the invention, the user may specify this date using one or more drop-down menus 1205–1215. Once the user enters the desired pickup date, they may proceed by selecting a "Continue" button 1220. Alternatively, the user may cancel the order by selecting a "Cancel" button 1225.

After the user has entered a requested pickup date and selected the "Continue" button 1220, the system determines whether any time windows are available for the requested pickup day in the manner described above with regard to Step 915. If one or more time windows is available for the requested pickup day, the system displays, on a pickup time window selection screen 1300, one or more buttons 1305 that correspond to these time windows. The user may select one of the displayed time windows by selecting a button 1305 corresponding to the desired time window and then selecting a "continue" button 1310.

If the system determines that no time windows are available for the requested pickup day, the system displays a screen that indicates that no time windows are available for the requested pickup day, and that provides the user with the option to cancel the order, or to specify a different pickup day. If the user chooses to specify a different pickup day, the system again displays the pickup date scheduling screen 1200, which is described above.

In addition to displaying one or more time windows that are available for the pickup, the pickup time window selection screen 1300 also includes a "Cancel" 1315 button that allows the user to exit the pickup time window selection screen 1300 without selecting one of the displayed time windows. In one embodiment of the invention, in response to the user selecting the "Cancel" button 1315, the system displays a pickup transition screen 1400, in which the system presents the user with one or more buttons 1405–1415 that correspond to various options as to how to proceed. More particularly, the pickup screen preferably includes a "Cancel Order" button 1405, a "Specify Another Day for the Pickup" button 1410, and a "Return to View Available Pickup Times" button 1415. If the user selects the "Cancel Order" button 1405, the system cancels the order and returns to the delivery service's main menu. If the user selects the "Specify Another Day for the Pickup" button 1410, the system returns the user to the pickup date scheduling screen 1200, where it allows the user to specify another date for the pickup. If the user selects the "Return to View Available Pickup Times" button 1415, the system returns to the pickup time window selection screen 1300, where it again displays the available time windows for the specified pickup day.

Once the user selects a button corresponding to a particular time window for the requested pickup day and selects the "Continue" button 1310, the system displays a delivery date scheduling screen 1500. This scheduling screen allows the user to specify a date on which they would like the cleaned items to be delivered (e.g., back to the user's home) after the items have been cleaned. In a preferred embodiment of the invention, the user may specify the delivery date using one or more drop-down menus, such as drop-down menus 1505–1515, which are shown in FIG. 15. Once the user enters the desired delivery date, they may proceed by selecting a "Continue" button 1520. Alternatively, the user may cancel the order by selecting a "Cancel" button 1525.

After a user has entered a requested delivery date and selected the "Continue" button 1520, the system determines whether there is sufficient processing time between the time window selected for the delivery and any time window within the requested delivery day. The system preferably makes this determination as described in regard to Step 950, above. If the system determines that there is not sufficient processing time between the time window selected for the pickup and any time window on the requested delivery day, the system displays a screen (not shown) that informs the user that the delivery may not be scheduled for the requested delivery day, and that provides the user with the option to cancel the order, or to specify a different delivery day. If the user chooses to specify a different day for the delivery, the system again displays the delivery date scheduling screen 1300 to facilitate allowing the user to select a different day for the delivery.

If the system determines that there is sufficient processing time between the time window selected for the pickup and any time window on the requested delivery day, the system uses the techniques described above in regard to Step 960 to determine whether any time windows are available for the requested delivery day. If one or more time windows are available for the requested delivery day, the system displays these time windows on a delivery time window selection screen 1600. The user may select one of these time windows by first selecting a button 1605–1615 that corresponds to the desired time window and then selecting a "continue" button 1620.

If the system determines that no time windows are available for the requested delivery day, the system displays a screen that indicates that no time windows are available for the requested delivery day, and that provides the user with the option to cancel the order, or to specify a different delivery day. If the user chooses to specify a different delivery day, the system again displays the delivery date scheduling screen 1200, which is described above, and allows the user to specify a different delivery date.

In addition, the delivery time window selection screen 1600 also includes a "Cancel" button 1625 that allows the user to exit the delivery time window selection screen 1600 without selecting one of the displayed time windows. In one embodiment of the invention, in response to the user selecting the "Cancel" button 1625, the system displays a delivery transition screen 1700, on which the system presents the user with various buttons 1705–1715 that correspond to options on how to proceed. More particularly, the delivery transition screen 1700 preferably includes a "Cancel Order" button 1705, a "Specify Another Day for the Delivery" button 1710, and a "Return to View Available Delivery Times" button 1715. If the user selects the "Cancel Order" button 1705, the system cancels the order and returns to the delivery service's main menu. If the user selects the "Specify Another Day for the Delivery" button 1710, the system returns the user to the delivery date scheduling screen 1500, where it allows the user to specify another date for the delivery. If the user selects the "Return to View Available Delivery Times" button, the system returns to the delivery time window selection screen 1600, where it again displays the available time windows for the specified pickup day.

Once a user selects a button corresponding to a delivery time window 1605–1615 on the delivery time window scheduling screen 1600 and then selects the "continue" button 1620, the system schedules both the pickup and the delivery to be made as specified by the user. In a preferred embodiment of the invention, the system "firmly" schedules the requested pickup and the requested delivery.

As will be understood by one skilled in the relevant field, while the example above describes a particular implementation of the invention within the context of a dry cleaning service, the invention has wide variety of applications to other fields. For example, the system may be used by a repair service to schedule the pickup of items to be repaired, and the delivery of the items back to the customer once the items are repaired. As another example, the system may be used by a pet grooming service to schedule the pickup of a pet to be groomed, and to schedule the delivery of the pet back to the customer once the pet has been properly groomed.

The system may also be used to schedule the occurrence of events other than pickups or deliveries. For example, in the embodiments described above, the system may be used to schedule re-occurring "customer visits" rather than delivery vehicle visits. As noted above, the term "customer visit" refers to a visit that is made to a customer to perform a service. Such a service may include, for example, a service (such as maintenance work or installation work) to be performed at the customer's residence. Such services may also include work that needs to be performed according to a periodic schedule, such as lawn service work or pool cleaning.

As will also be understood by one skilled in the relevant field, while the example above describes an implementation of the invention in which the user schedules a pickup from the user's home, and a delivery back to the user's home, the system may also be configured to schedule a pickup from a first address and a delivery to a second address that is different from the first address. This may be useful, for example, in a situation in which the user wants to have her laundry picked up from their home, and delivered, after cleaning, to their place of business.

An additional aspect of the invention that will be understood by one skilled in the relevant field is that, while the example above describes an implementation of the invention in which the user schedules a pickup to be made before a related delivery, a system according to the invention may also be used to schedule a delivery to be made before a related pickup. Such an embodiment of the invention may be used, for example, by movie rental companies to allow their customers to schedule a delivery of a DVD to be made to the customer's home within a first time window, and also to schedule a time to have the DVD picked up from the user's home after the user has finished watching the movie.

Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What we claim is:

1. A computer-readable medium for scheduling delivery vehicle visits to a customer, said computer-readable medium comprising computer-executable instructions for performing the steps of:

(1) receiving a single request from a user to schedule a periodic series of delivery vehicle visits to said customer, said periodic series of delivery vehicle visits comprising a first delivery vehicle visit to be made on a first day and two or more additional delivery vehicle visits to be made on subsequent days, each delivery vehicle visit within said periodic series to be made on a different day, but within a particular time window, wherein said particular time window is a discrete block of time having a specified start time and a specified end time;

(2) allowing said user to specify a schedule for said periodic series of delivery vehicle visits;

(3) determining whether to schedule said first delivery vehicle visit within said particular time window on said first day;

(4) determining, for each respective one of said two or more additional delivery vehicle visits, whether to schedule said respective delivery vehicle visit within said particular time window on a particular respective one of said subsequent days; and (5) in response to a combination of: (a) said request, (b) a determination in Step (3) that said first delivery vehicle visit should be scheduled within said particular time window on said first day, and (c) a determination in Step (4) to schedule each respective one of said two or more additional delivery vehicle visits to be made within said particular time window on a particular respective one of said subsequent days;

(a) scheduling said first delivery vehicle visit to be made within said particular time window on said first day; and (b) scheduling each of said respective additional delivery vehicle visits to be made within said particular time window on a particular respective one of said subsequent days;

wherein, in response to determining not to schedule a particular one of said periodic series of delivery vehicle visits:

identifying, and presenting to the user, two or more alternative time windows; and allowing said user to schedule said particular delivery vehicle visit to be made within a particular one of said two or more alternative time windows; and wherein said step of allowing said user to specify a schedule for said periodic series of delivery vehicle visits includes allowing said user to specify a certain number of delivery vehicle visits to be completed in said series, and a frequency with which said delivery vehicle visits are to occur.

2. The computer-readable medium of claim 1, wherein:

said Step (3) includes determining whether it would be possible to make said first delivery vehicle visit within said particular time window on said first day; and and Step (4) includes determining, for each particular one of said two or more additional delivery vehicle visits, whether it would possible to make said particular delivery vehicle visit within said particular time window on a particular respective one of said subsequent days.

3. The computer-readable medium of claim 1, wherein:

said Step (3) includes determining whether it would be economically desirable to make said first delivery vehicle visit within said particular time window on said first day; and and Step (4) includes determining, for each particular one of said two or more additional delivery vehicle visits, whether it would economically desirable to make said particular delivery vehicle visit within said particular time window on a particular respective one of said subsequent days.

4. The computer-readable medium of claim 1, wherein:

said first delivery vehicle visit is a first delivery;

said first delivery includes a first set of items;

said two or more additional delivery vehicle visits are additional deliveries; and said additional deliveries each include a second set of items.

5. The computer-readable medium of claim 4, wherein:

said first set of items includes substantially all of the items delivered during said first delivery; and said second set of items includes substantially all of the items within said first set of items.

6. The computer-readable medium of claim 5, wherein said single request comprises:

a definition of said first set of items;

an indication that said first set of items should be delivered within said particular time window on said first day; and an indication that said first set of items should be delivered, according to a reoccurring delivery schedule, within said particular time window an at least one day other than said first day.

7. The computer-readable medium of claim 1, wherein said computer-readable medium comprises computer-executable instructions for performing said Steps (1), (2), (3), (4), and (5) in real time.

8. The computer-readable medium of claim 1, wherein said computer-readable medium further comprises computer-executable instructions for displaying a confirmation message to said user confirming that said periodic series of delivery vehicle visits has been scheduled, and wherein said step of displaying a confirmation message is executed in response to a combination of:

(a) said request, (b) a determination in Step (3) that said first delivery vehicle visit should be scheduled within said particular time window on said first day, and (c) a determination in Step (4) to schedule each respective one of said two or more additional delivery vehicle visits to be made within said particular time window on a particular respective one of said subsequent days.

9. The computer-readable medium of claim 1, wherein:

said first delivery vehicle visit is a first pickup; and said two or more additional delivery vehicle visits are additional pickups.

10. The computer-readable medium of claim 1, wherein said computer-readable medium further comprises computer-executable instructions for displaying a message to said user indicating that said periodic series of delivery vehicle visits cannot be scheduled, and wherein said step of displaying said message is executed in response to a combination of:

(a) said request, and (b) a determination in Step (3) not to schedule said first delivery vehicle visit within said particular time window on said first day, or (c) a determination in Step (4) not to schedule at least one of said two or more additional delivery vehicle visits within said particular time window on one of said subsequent days.

11. The computer-readable medium of claim 1, wherein said computer-readable medium further comprises computer-executable instructions for, in response to determining not to schedule a particular one of said periodic series of delivery vehicle visits:

identifying, and presenting to the user, two or more alternative time windows; and allowing said user to schedule said particular delivery vehicle visit to be made within a particular one of said two or more alternative time windows.

12. A method of scheduling delivery vehicle visits to a customer, said method comprising the steps of:

(1) receiving a single request from a user to schedule a periodic series of delivery vehicle visits to said customer, said periodic series of delivery vehicle visits comprising a first delivery vehicle visit to be made on a first day and two or more additional delivery vehicle visits to be made on subsequent days, each delivery vehicle visit within said periodic series to be made on a different day, but within a particular time window, wherein said particular time window is a discrete block of time having a specified start time and a specified end time;

(2) allowing said user to specify a schedule for said periodic series of delivery vehicle visits;

(3) determining, via a computer processor, whether to schedule said first delivery vehicle visit within said particular time window on said first day;

(4) determining, for each respective one of said two or more additional delivery vehicle visits, whether to schedule said respective delivery vehicle visit within said particular time window on a particular respective one of said subsequent days; and (5) in response to a combination of: (a) said request, (b) a determination in Step (3) that said first delivery vehicle visit should be scheduled within said particular time window on said first day, and (c) a determination in Step (4) to schedule each respective one of said two or more additional delivery vehicle visits to be made within said particular time window on a particular respective one of said subsequent days:

(a) scheduling said first delivery vehicle visit to be made within said particular time window on said first day; and (b) scheduling each of said respective additional delivery vehicle visits to be made within said particular time window on a particular respective one of said subsequent days;

wherein, in response to determining not to schedule a particular one of said periodic series of delivery vehicle visits:

identifying, and presenting to the user, two or more alternative time windows; and allowing said user to schedule said particular delivery vehicle visit to be made within a particular one of said two or more alternative time windows; and wherein said step of allowing said user to specify a schedule for said periodic series of delivery vehicle visits includes allowing said user to specify a certain number of delivery vehicle visits to be completed in said series, and a frequency with which said delivery vehicle visits are to occur.

13. The method of claim 12, wherein:
said first delivery vehicle visit is a first delivery;
said first delivery includes a first set of items;
said two or more additional delivery vehicle visits are additional deliveries;
said additional deliveries each include a second set of items;
said first set of items includes all of the items delivered during said first delivery; and
said second set of items includes substantially all of the items within said first set of items.

14. The method of claim 13, wherein said single request comprises:
a definition of said first set of items;
an indication that said first set of items should be delivered within said particular time window on said first day; and
an indication that said first set of items should be delivered, according to a reoccurring delivery schedule, within said particular time window on at least one day other than said first day.

15. The method of claim 12, wherein said Steps (1), (2), (3), (3), and (5) are performed in a real time computing environment.

16. The method of claim 12, wherein:
said first delivery vehicle visit is a first pickup; and
said two or more additional delivery vehicle visits are additional pickups.

17. A system for scheduling delivery vehicle visits to a customer, said system comprising:
a central processing unit; and
a memory coupled to said central processing unit;
said central processing unit being configured for:

(1) receiving a single request from a user to schedule a periodic series of delivery vehicle visits to said customer, said periodic series of delivery vehicle visits comprising a first delivery vehicle visit to be made on a first day and two or more additional delivery vehicle visits to be made on subsequent days, each delivery vehicle visit within said periodic series to be made on a different day, but within a particular time window, wherein said particular time window is a discrete block of time having a specified start time and a specified end time;

(2) allowing said user to specify a schedule for said periodic series of delivery vehicle visits;

(3) determining whether to schedule said first delivery vehicle visit within said particular time window on said first day;

(4) determining, for each respective one of said two or more additional delivery vehicle visits, whether to schedule said respective delivery vehicle visit within said particular time window on a particular respective one of said subsequent days;

(5) in response to a combination of: (a) said request, (b) a determination in Step (3) that said first delivery vehicle visit should be scheduled within said particular time window on said first day, and (c) a determination in Step (4) to schedule each respective one of said two or more additional delivery vehicle visits to be made within said particular time window on a particular respective one of said subsequent days:

(a) scheduling said first delivery vehicle visit to be made within said particular time window on said first day; and (b) scheduling each of said respective additional delivery vehicle visits to be made within said particular time window on a particular respective one of said subsequent days;

wherein, in response to determining not to schedule a particular one of said periodic series of delivery vehicle visits:

identifying, and presenting to the user, two or more alternative time windows; and allowing said user to schedule said particular delivery vehicle visit to be made within a particular one of said two or more alternative time windows; and wherein said step of allowing said user to specify a schedule for said periodic series of delivery vehicle visits includes allowing said user to specify a certain number of delivery vehicle visits to be completed in said series, and a frequency with which said delivery vehicle visits are to occur.

18. The system of claim 17, wherein:
said first delivery vehicle visit is a first delivery;
said first delivery includes a first set of items;
said two or more additional delivery vehicle visits are additional deliveries;
said additional deliveries each include a second set of items;
said first set of items includes all of the items delivered during said first delivery; and
said second set of items includes substantially all of the items within said first set of items.

19. The system of claim 17, wherein said central processing unit is further configured for performing said Steps (1), (2), (3), (4), and (5) in real time.

20. The system of claim 17, wherein:
said first delivery vehicle visit is a first pickup; and
said two or more additional delivery vehicle visits are additional pickups.

21. A computer-readable medium for scheduling customer visits to a customer, said computer-readable medium comprising computer-executable instructions for performing the steps of:
(1) receiving a single request from a user to schedule a periodic series of customer visits to said customer, said periodic series of customer visits comprising a first customer visit to be made on a first day and two or more additional customer visits to be made on subsequent days, each customer visit within said periodic series to be made on a different day, but within a particular time window, wherein said particular time window is a discrete block of time having a specified start time and a specified end time;
(2) allowing said user to specify a schedule for said periodic series of customer visits;
(3) determining whether to schedule said first customer visit within said particular time window on said first day;
(4) determining, for each respective one of said two or more additional customer visits, whether to schedule said respective customer visit within said particular time window on a particular respective one of said subsequent days; and
(5) in response to a combination of: (a) said request, (b) a determination in Step (3) that said first customer visit should be scheduled within said particular time window on said first day, and (c) a determination in Step (4) to schedule each respective one of said two or more additional customer visits to be made within said particular time window on a particular respective one of said subsequent days:
 (a) scheduling said first customer visit to be made within said particular time window on said first day; and
 (b) scheduling each of said respective additional customer visits to be made within said particular time window on a particular respective one of said subsequent days;
wherein, in response to determining not to schedule a particular one of said periodic series of delivery vehicle visits:
 identifying, and presenting to the user, two or more alternative time windows; and
 allowing said user to schedule said particular delivery vehicle visit to be made within a particular one of said two or more alternative time windows; and
wherein said step of allowing said user to specify a schedule for said periodic series of delivery vehicle visits includes allowing said user to specify a certain number of delivery vehicle visits to be completed in said series, and a frequency with which said delivery vehicle visits are to occur.

22. The computer-readable medium of claim 21, wherein:
said Step (3) includes determining whether it would be possible to make said first customer visit within said particular time window on said first day; and
and Step (4) includes determining, for each particular one of said two or more additional customer visits, whether it would possible to make said particular customer visit within said particular time window on a particular respective one of said subsequent days.

23. The computer-readable medium of claim 21, wherein:
said Step (3) includes determining, whether it would be economically desirable to make said first customer visit within said particular time window on said first day; and
and Step (4) includes determining, for each particular one of said two or more additional customer visits, whether it would economically desirable to make said particular customer visit within said particular time window on a particular respective one of said subsequent days.

* * * * *

UNITED STATES PATENT AND TRADEMARK OFFICE
CERTIFICATE OF CORRECTION

PATENT NO. : 6,985,871 B2
DATED : January 10, 2006
INVENTOR(S) : Simon et al.

It is certified that error appears in the above-identified patent and that said Letters Patent is hereby corrected as shown below:

Title page,
Item [56], References Cited, OTHER PUBLICATIONS,
"E-Business in the New Beverage Marketplace" reference, "New Yprk" should read -- New York --.

Column 18,
Line 16, "request" should read -- requested --;
Line 18, "tying" should read -- trying --;
Line 19 (both occurrences), "wich" should read -- which --;
Lines 23 and 24, "wich" should read -- which --.

Column 22,
Line 66, cancel the first "the".

Column 23,
Line 1, after "one" insert -- or --;
Line 2, "wich" should read -- which --;
Line 5, "display" should read -- displayed --.

Column 29,
Line 66, "an" should read -- on --.

Column 30,
Lines 40-49, delete Claim 11 in its entirety and insert claim 82 as follows:
-- The computer-readable medium of claim 1, wherein said particular time window is about one hour in length. --.

Signed and Sealed this

Sixth Day of June, 2006

JON W. DUDAS
*Director of the United States Patent and Trademark Office*